(12) United States Patent
Hirotsune et al.

(10) Patent No.: US 7,601,412 B2
(45) Date of Patent: Oct. 13, 2009

(54) INFORMATION RECORDING MEDIUM, INFORMATION REPRODUCTION METHOD AND INFORMATION RECORDING METHOD

(75) Inventors: Akemi Hirotsune, Saitama (JP); Yumiko Anzai, Oume (JP)

(73) Assignee: Hitachi, Ltd., Tokyo (JP)

( * ) Notice: Subject to any disclaimer, the term of this patent is extended or adjusted under 35 U.S.C. 154(b) by 215 days.

(21) Appl. No.: 11/319,073

(22) Filed: Dec. 28, 2005

(65) Prior Publication Data

US 2007/0009702 A1  Jan. 11, 2007

(30) Foreign Application Priority Data

Jul. 6, 2005  (KR) .............................. 2005-196967

(51) Int. Cl.
  *B32B 3/02* (2006.01)
  *G11B 7/24* (2006.01)
(52) U.S. Cl. ................. 428/64.4; 428/64.5; 430/270.13
(58) Field of Classification Search ................ 428/64.2, 428/64.4, 64.5, 64.6; 430/270.11, 270.12, 430/270.13

See application file for complete search history.

(56) References Cited

U.S. PATENT DOCUMENTS

| | | | |
|---|---|---|---|
| 5,591,501 A * | 1/1997 | Ovshinsky et al. ......... 428/64.1 |
| 6,181,650 B1 | 1/2001 | Ichihara | |
| 6,187,460 B1 | 2/2001 | Nishimura | |
| 6,197,399 B1 * | 3/2001 | Naito et al. ................. 428/64.1 |
| 6,724,716 B2 * | 4/2004 | Yamaguchi et al. ...... 369/275.2 |
| 2003/0117936 A1 * | 6/2003 | Wrobel et al. ........... 369/275.4 |

FOREIGN PATENT DOCUMENTS

| | | |
|---|---|---|
| JP | 6-295479 | 10/1994 |
| JP | 10-269627 | 10/1998 |
| JP | 2004-87041 | 3/2004 |

* cited by examiner

*Primary Examiner*—Kevin M. Bernatz
*Assistant Examiner*—Gerard T Higgins
(74) *Attorney, Agent, or Firm*—Antonelli, Terry, Stout & Kraus, LLP.

(57) ABSTRACT

A method for mass-producing a recording mark capable of being reproduced even below the diffraction limit in the information recording medium. A medium comprising: a substrate including a first material on the surface, and a second material formed on a first area on the substrate, and a third material at least whose surface energy or surface curvature are different from the second material, and the second material and third material possess at least different chemical or physical characteristics, and at least the surface energy or surface curvature of the third material are greater than the second material, moreover a region formed of the third material contains less than 20 percent of the second material, and the second or the third material can be melted for performing recording or reproduction, so that a recording mark can be produced that is capable of being read even below the diffraction limit in the information recording medium.

7 Claims, 36 Drawing Sheets

FIG. 17 A
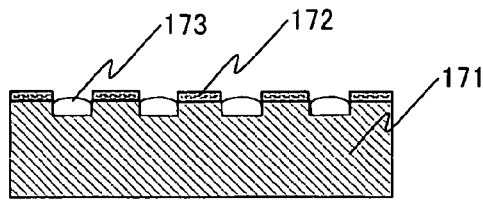
FIG. 17 B
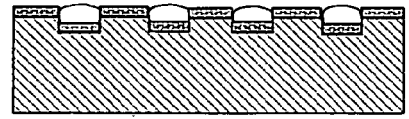
FIG. 17 C
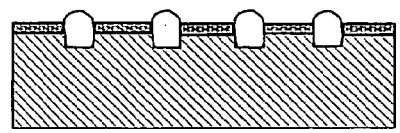
FIG. 17 D
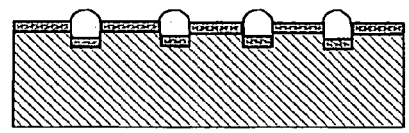
FIG. 17 E
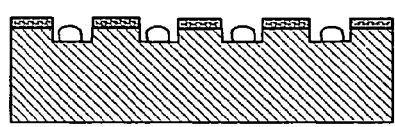
FIG. 17 F
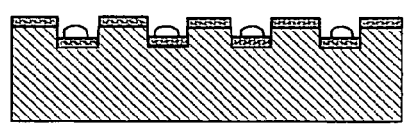
FIG. 17 G
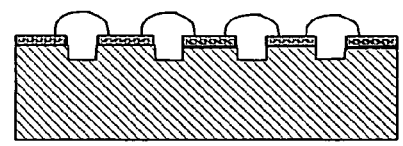
FIG. 17 H
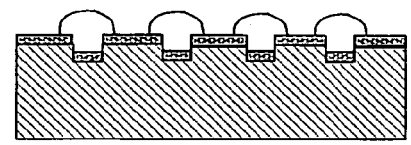
FIG. 17 I
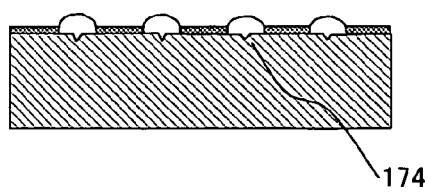
FIG. 17 J
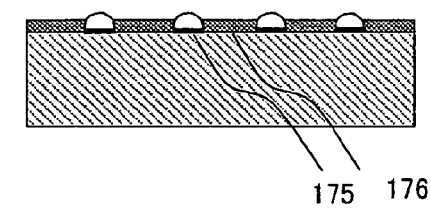
FIG. 17 K
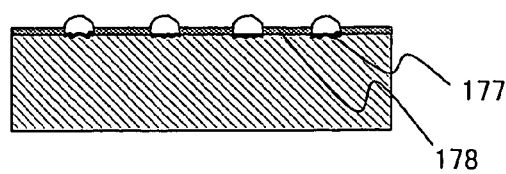
FIG. 17 L comparative example
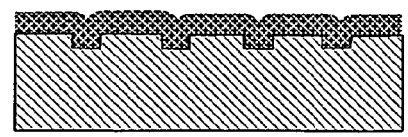

301 functionless area 302 mixed area of functional area and functionless area 301   303

211 functionless area
212 functional area 214 protective substrate
211   212   211
213 substrate 214
351
352
213

INFORMATION RECORDING MEDIUM, INFORMATION REPRODUCTION METHOD AND INFORMATION RECORDING METHOD

CLAIM OF PRIORITY

The present invention claims priority from Japanese application JP 2005-196967 filed on Jul. 6, 2005, the content of which is hereby incorporated by reference into this application.

FIELD OF THE INVENTION

The present invention relates to an information recording method, reproduction method and information recording medium for recording or reproducing by utilizing an energy beam.

BACKGROUND OF THE INVENTION

Various principles are known for recording information by irradiating a thin film (recording film) with an energy beam such as a laser. Among these, one principle utilizes the change in the atomic matrix that occurs from irradiating a laser onto a film material to induce a phase change (also called phase transition, phase change state), etc.

Usually an information recording medium is made up of a first protective layer, a recording film such as of Ge—Sb—Te alloy, an upper protective layer, and a reflective layer; and recording is performed by irradiating light to making the recording film amorphous, and erase performed by irradiating light to crystallize the film. The minimum mark size was determined by the diffraction limit of the spot.

Methods for reading (reproducing) marks below the diffraction limit that are known up to now are methods that utilized super resolution or magnifying the magnetic domain. Examples of this technology were disclosed in JP-A No. 269627/1998 for using the heat of a laser to read tiny marks by forming small optical apertures smaller than the spot size and utilizing a film such as Ge—Sb—Te as the super-resolution read layer. Another method called the MAMMOS (Magnetic amplifying magneto-optical system) as disclosed in JP-A No. 295479/1994 and JP-A No. 087041/2004, are known that form recording magnetic domains on an enlarged read (reproduction) layer by magnetic transcription, to fully enlarge the spot size of the read light by means of read light irradiated onto the recording magnetic domain from the read light irradiating section.

SUMMARY OF THE INVENTION

These reproduction (or read) methods that utilize super-resolution or magnifying of magnetic domains are capable of reproducing or reading marks below the diffraction limit yet respectively possess the following problems.

The super-resolution read method disclosed in JP-A No. 269627/1998 performed read (or reproduction) while melting a Ge—Sb—Te film so that a fluid flow in the read layer occurred during multiple read operations. However this method caused the signal quality to deteriorate, and had the further problem that it was incompatible with the WORM type.

The magnetic amplifying system disclosed in JP-A No. 295479/1994 and JP-A No. 087041/2004 is a WORM or rewriteable type method for reading marks recorded one at a time by laser beam, and had the problem that it was incompatible with ROMs.

A functional material B and a functional material C with different surface energies are formed on respectively different regions on a bottom layer A, and possess different physical and chemical characteristics. The surface energy or the surface diffraction of material C is larger than material B, moreover the material B content is in a range below 20 percent in the region formed by the material C, and is utilized as a material comprising at least one of functional material B and functional material C at melting temperature or higher. A so-called recording mark (or space) can be formed by melting the material B or the material C to allow recording information.

The recording medium is fabricated as described next. A change is made to occur in the form or structure within the layer by applying light or thermal type energy to a functional layer formed on or contacting a structure where the material B and material C are mixed, on a substrate possessing a first material (material A). In other words, areas with different chemical or physical characteristics can be formed by heating and locally fusing (melting) a functional material B and functional material C possessing different surface energies within a functional layer, so that the material with a large surface energy acts to reduce the surface area in a state where the elements in the composition easily flow; and the material with a small surface energy does not act to prevent that flow. Also, a desired material can be formed on a desired area by crystallized material subjected to light or thermal energy that acts to eliminate excess material in the crystallizing process, so that composition elements flowing within the layer each collect as a respective functional material, by a flow that acts to separate the elements from the crystallized material smoothly, without interfering with the crystallizing process. The material C preferably possesses greater surface energy than the material B and there is no dependency on the bottom layer A. A material content below 20 percent is a consequence of the separation and flow (of material), showing that only a small amount of material B is contained in material C, and is proof of phase separation.

In the region in particular formed by the material C in the vicinity of the first material serving as the bottom layer, there is residual material B, and so the material B content often increases towards the bottom layer. The material content will of course be below 20 percent due to effects of phase separation.

Even if not each material, a portion of the composition comprising that material will flow, allowing a signal (recording mark) with different optical, thermal or magnetic characteristics to then be distinguished from among other signals. A slight amount of the main element serving as functional material B, is contained in the area of functional material C possessing large surface energy, the content of functional material B is also different on sides contacting the substrate and the surface side, and there is a higher content of functional material B on the side contacting the substrate. Changing the composition is easier when there is thermal jitter or tiny uneven sections (irregularities) on the bottom surface contacting the functional layer or the substrate surface. If for example, there are uneven sections (irregularities) on the substrate surface, then the functional material B and the functional material C can easily be separated into projections and dents within the functional layer. A material flow can also be easily induced between the functional material B and the functional material C by forming areas with different surface energies, by means of wetness on the bottom, etc.

This invention is capable of forming a large quantity of recording marks that can be reproduced on the information recording medium even below the diffraction limit at one time. A medium containing ROM or WO marks in sizes below this type of optical diffraction limit can also be obtained.

BRIEF DESCRIPTION OF THE DRAWINGS

FIG. 17 is a drawing of the recording mark production method of the eighth embodiment of this invention;

DETAILED DESCRIPTION OF THE PREFERRED EMBODIMENTS

The embodiments of this invention are next described in detail.

First Embodiment

The first embodiment is an example for forming a large quantity of recording marks at one time by utilizing the difference in surface energies.

(Information recording method and information recording medium of this invention)

Figure 1:
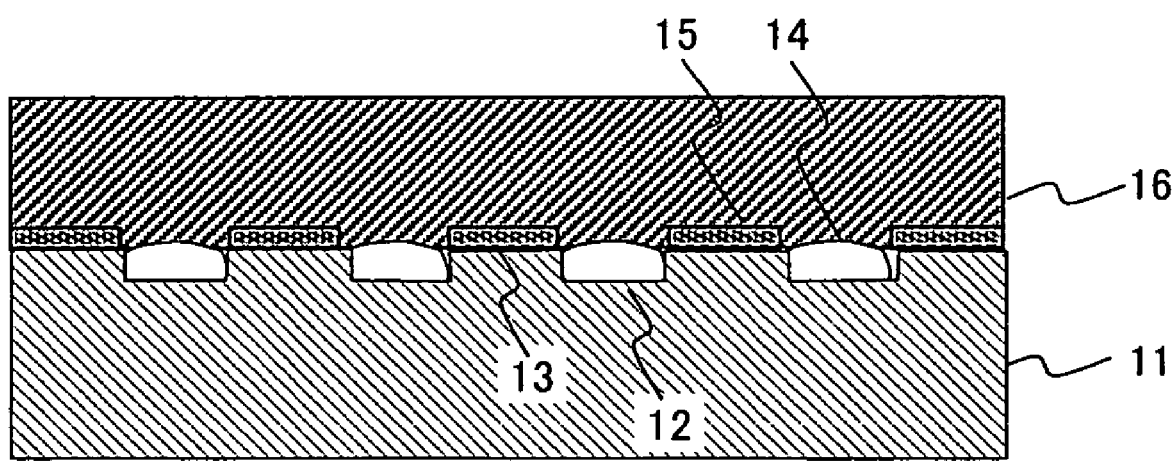
FIG. 1 is a cross sectional structural view of the first embodiment of this invention.

FIG. 1 is a cross sectional structural view of the disk information recording medium of the first embodiment of this invention. In this medium, a functional material 14 made from gold (Au), which is a metal material, as the main element in the dents 12, and a functional material 15 made from Ge—Sb—Te as the main element in the projections 13 are formed separately on a substrate 11 containing an uneven section ROM pattern on the surface; and this surface is covered by a protective layer. Here, the spaces are gold (Au) and the marks are Ge—Sb—Te. The functional material 14 with a higher surface energy includes a curved surface with a larger curvature ratio compared to the functional material 15 possessing a lower surface energy. Hereafter, functional material with a higher surface energy is called the functional material C or third material; and the functional material with a lower surface energy is called the functional material B or second material.

Figure 9:
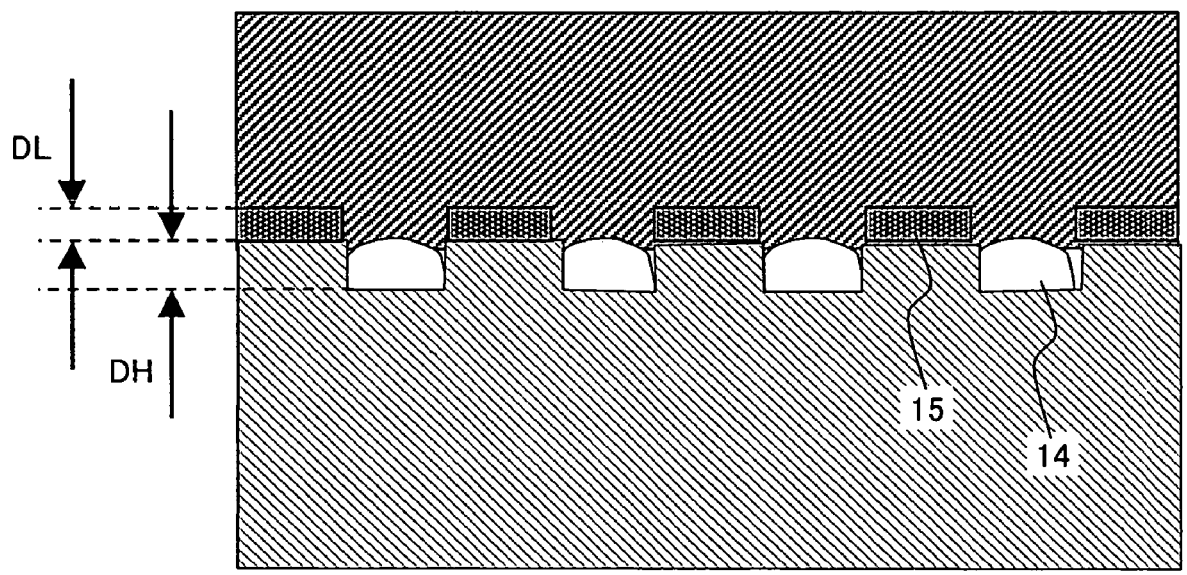
FIG. 9 is a cross sectional view showing the definition of the height of the functional material for this invention.

As shown in FIG. 9, when each functional material was measured, the thickness DH of functional material C (14) was largely the same as the thickness DL of functional material B (15). When the thickness of both layers is largely the same, the production yield in the next process is improved. Here, when the protective substrate was formed, there were less alignment irregularities and the production yield was improved. There is also greater film uniformity and a higher production yield during film forming.

Figure 2:
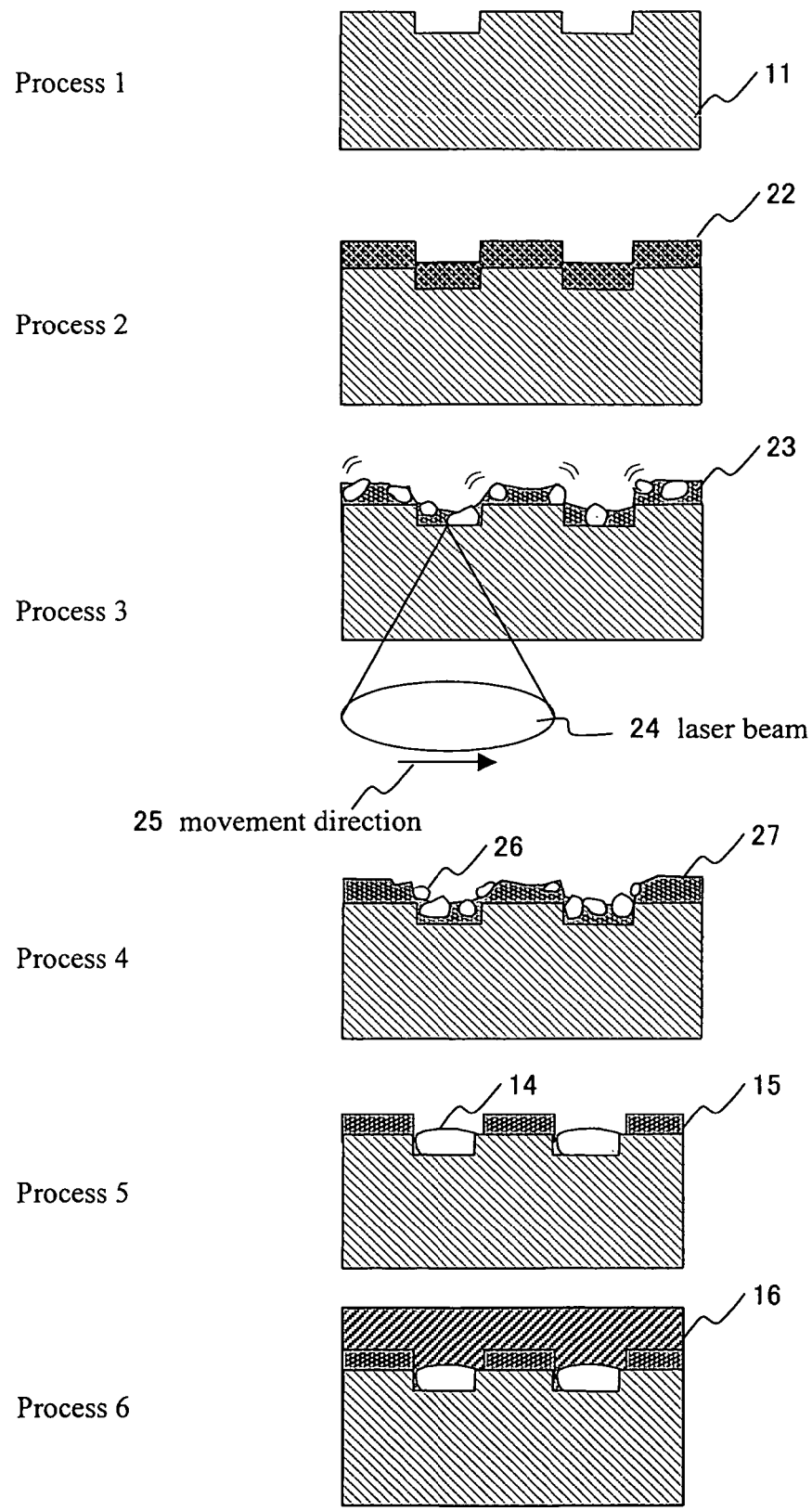
FIG. 2 is drawings of the recording mark production method of the first embodiment of this invention.

The recording marks were fabricated as described next. The recording mark forming method is shown in FIG. 2. First of all, a recording mark forming film 22 of Au—Ge—Sb—Te was formed to 25 nm by sputtering on a 1.1 millimeter thick polycarbonate protective substrate 11 (process 1) with a diameter of 12 centimeters, covered with $SiO_2$ film on the surface and containing uneven section ROM patterns on the surface. A laser beam 24 was then irradiated onto the recording mark forming film 22 as the process 3. The laser beam was here moved during the irradiation in the direction of movement as shown by the moving direction 25. A sheet beam of approximately 5 microns in width and approximately 50 microns long was utilized as the laser (beam). This process moreover can be performed quickly when the energy is irradiated by a sheet beam with a large surface area. The recording mark forming film material is divided into separations 26, 27 by the differences in surface energy in the energy-irradiated film 23 as shown in process 5, forming a spaces 14 comprised of gold (Au) as the main element in the dents, and a projection 15 comprised of Ge—Sb—Te as the main element in the projections. The state from the process 3 to the process 5 is shown by process 4. Here the section 26 comprised of gold (Au) as the main element, and the section 27 comprised of Ge—Sb—Te as the main element are shown in the process of separating. After forming the recording marks in this way, the protective substrate 16 was formed to protect the surface.

Among these processes, process 2 can be performed in 1 to 10 seconds, and processes 3 to 5 can be completed in 15 to 60 seconds so that the time for forming the recording mark is reduced to $1/100^{th}$ or less that of the related art.

Results from analyzing the space sections 14 made with gold (Au) as the main element in the dents revealed that they contained a mere 2 to 19 percent of Ge, Sb, and Te.

Figure 3:
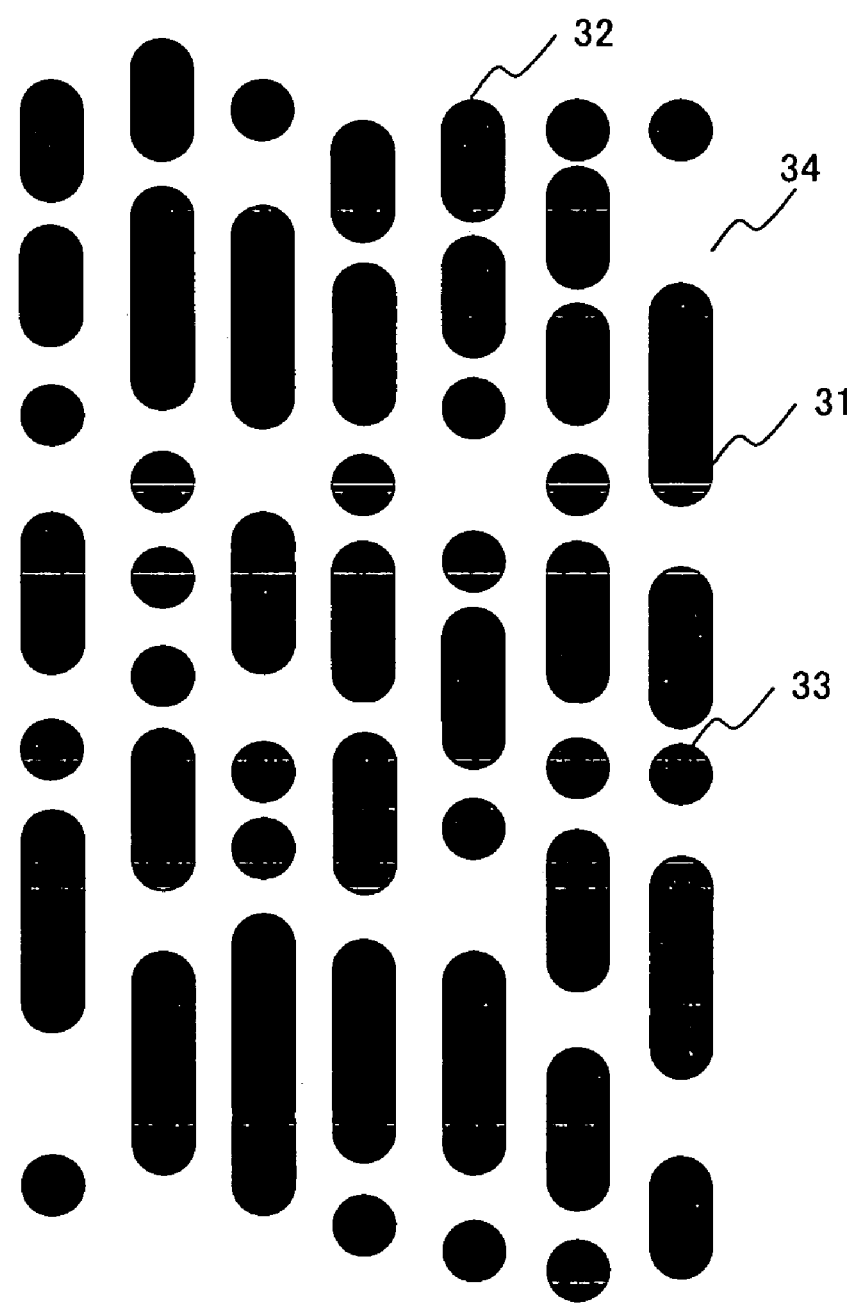
FIG. 3 is a flat view of recording mark placement in the first embodiment of this invention.

FIG. 3 is a view from the top surface showing the placement of the marks and spaces formed by the above described production method. The placement is made up of marks 31, 32, 33 of different lengths and spaces 34. The reference numeral 33 denotes the shortest mark.

$$Dt*10/Z \leq Sm \qquad \text{Formula (1)}$$

$$Z \leq 4 \qquad \text{Formula (2)}$$

in formula (1) and formula (2). Results from a number of functional material compositions are shown in Table 1. The surface energy of each material is shown here by comparing the values measured for the surface tension (mN/m). The above description shows that in order to make the separated shapes smaller, the average film thickness Dt should be made smaller so as to satisfy the relation of formula (1) and formula (2) or the relation of formula (3) or formula (4) described later on. It can also be seen that since the average film thickness is determined by the surface energy ratio for both functional materials, the DT will differ according to the material composition. For example, if forming a 100 nm mark with a functional material C or third material of Au (gold), which is a metal material, and a functional material B or second material Ge—Sb—Te, then the average film thickness must be less than 33 nm; and when forming a 50 nm mark, the Dt must be set to 17 nm. However as shown in Table 1, energy acts to restrict movement along a planar direction so that when the surface energy ratio Z reaches 4 or more, the results for Z were the same as 4. In other words, the relation between Dt and Sm is shown by formula (3) and formula (4).

$$Dt*10/4 \leq Sm \qquad \text{Formula (3)}$$

$$Z > 4 \qquad \text{Formula (4)}$$

TABLE 1

| Functional material C | Surface tension of C $\gamma_0$(mN/m) | Functional material B | Surface tension of B $\gamma_0$(mN/m) | Surface energy ratio Z | Dt (100) (nm) | Dt (50) (nm) |
|---|---|---|---|---|---|---|
| Au | 1140 | Ge—Sb—Te | 333 | 3 | 33 | 17 |
| Ag | 903 | Ge—Sb—Te | 333 | 3 | 30 | 15 |
| Zn | 782 | Ge—Sb—Te | 333 | 2.3 | 24 | 12 |
| Ti | 1650 | Ge—Sb—Te | 333 | 5 | 37 | 20 |
| W | 2500 | Ge—Sb—Te | 333 | 8 | 39 | 21 |
| Cu | 1285 | Ge—Sb—Te | 333 | 4 | 36 | 19 |
| Pd | 1500 | Ge—Sb—Te | 333 | 5 | 37 | 20 |
| Sb | 367 | Ge—Sb—Te | 333 | 1.1 | Insufficient separation | |
| In | 556 | Ge—Sb—Te | 333 | 1.7 | Insufficient separation | |
| Sn | 544 | Ge—Sb—Te | 333 | 1.6 | Insufficient separation | |
| Bi | 378 | Ge—Sb—Te | 333 | 1.1 | Insufficient separation | |

In the case of WO and WORM types, the pitch of the WORM mark forming section and the spaces are formed to a length proportional to the window width Tw. After these are formed, a WORM phase boundary layer is fabricated for example from sulfur compounds such as CUS for the WORM type. When recording the WORM mark forming section, the recording must be performed at higher power than during read (reproduction). The material of the WORM mark forming section in this way reacts with the WORM phase boundary layer, to form a WORM recording mark. The section that became the WORM recording mark does not crystallize during read (reproduction) but the other sections crystallize and therefore the signal amplitude between them can be obtained.

Next, investigating the relation between the average film thickness Dt which is the sum of the functional material C and functional material B, and the minimum size Sm as the separate shape, revealed the relation shown by:

When the surface energy rate is below 2, the separation was insufficient and the functional material B contained 30 to 40 percent of functional material C. The separation improves somewhat when subjected to low energy radiation for a long period of time.

(Functional Region and Functionless Region)

Figure 21:
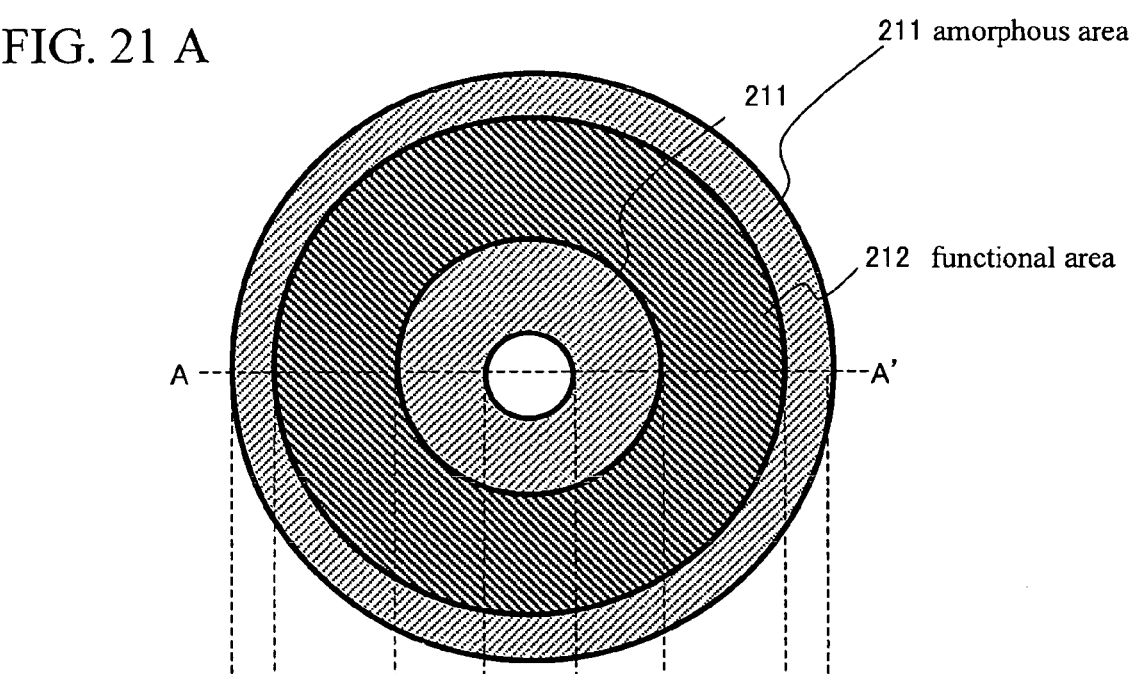
FIG. 21 is a drawing showing the functional area within the medium of this invention.
Figure 21:
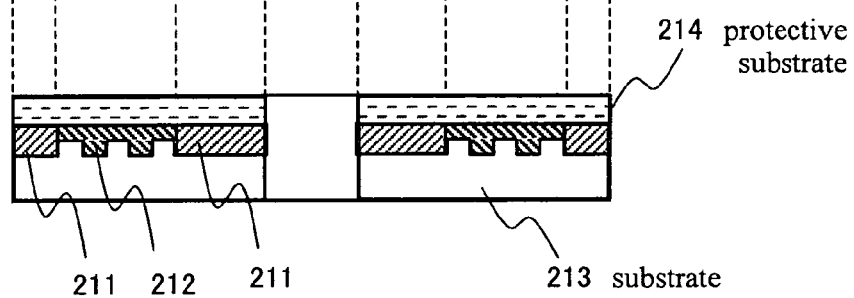

FIG. 21 shows the overall information recording medium. As described in FIG. 2, record mark forming is performed on most of the area on the medium where the record mark forming film 22 is formed; and these areas (or sections) are utilized as the functional area 212. Those sections where record mark forming film is present but record mark forming is not performed remain as the functionless area 211. Since the functionless area possesses no uneven sections (irregularities), the separation is insufficient, and there is no irradiation by laser so that the forming of record marks does not occur. Forming these type of areas, allows dealing with mask offsets (deviations) on the film, and position offsets during forming of the recording marks during production, and therefore improves the production yield of the information recording medium. In FIG. 21, the functionless area is exposed in cross section (b) however this may be covered with a protective substrate without forming a film to the edge of the substrate. A film that is not left exposed is better in terms of responding to environmental changes and improving the storage life.

Figure 33:
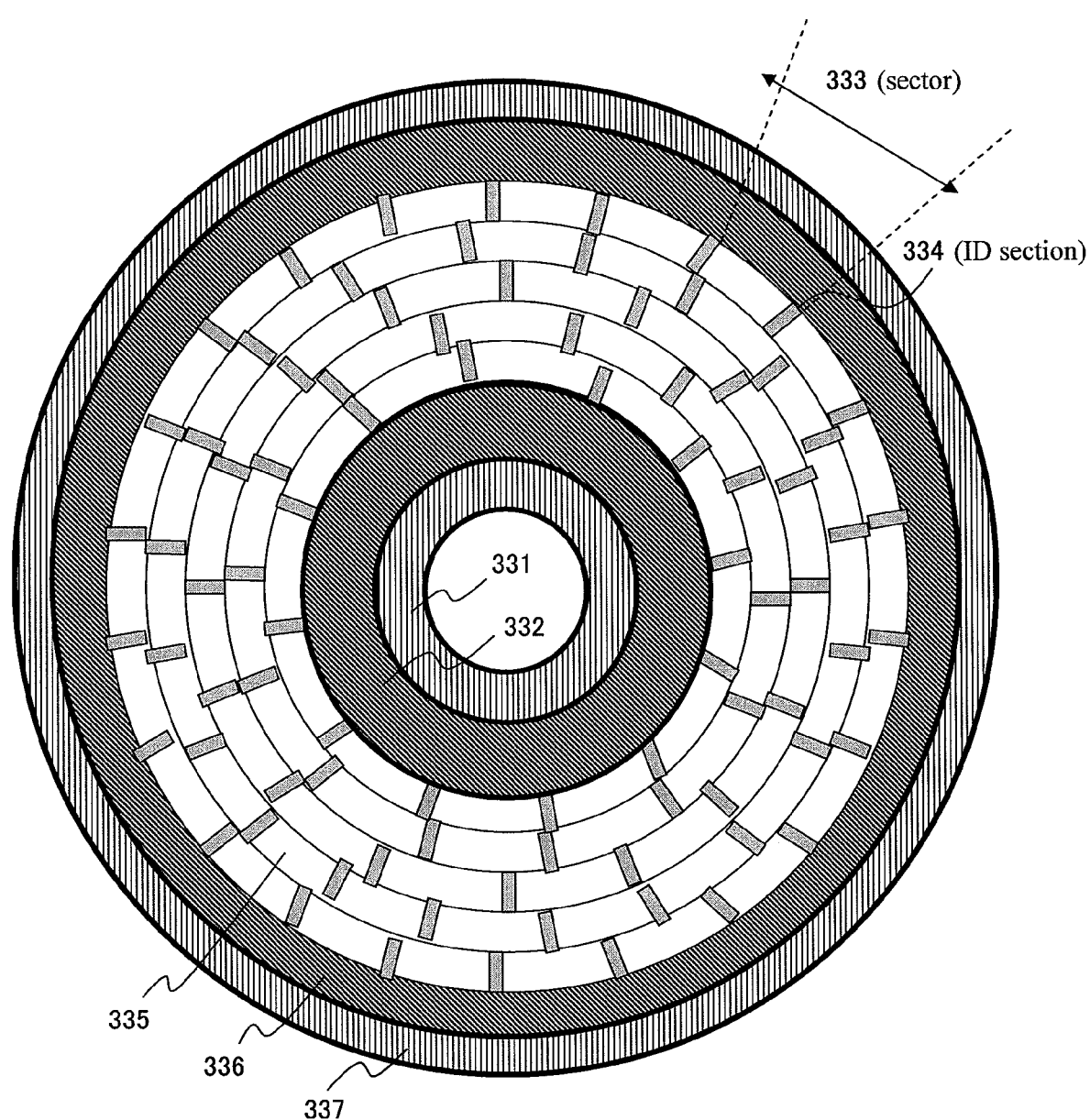
FIG. 33 is a drawing showing the relation of the functional area and functionless area with the user data region.

FIG. 33 shows the relation between the functional area and functionless area and the user data area. There is no film on the innermost 331 and the outermost 337 of the medium, and the functionless regions 332, 336 are formed on their inner sides. The functional area 335 is the user data area. The user data area is separated into multiple sections and contains the sector 333 and the ID section 334.

Figure 34:
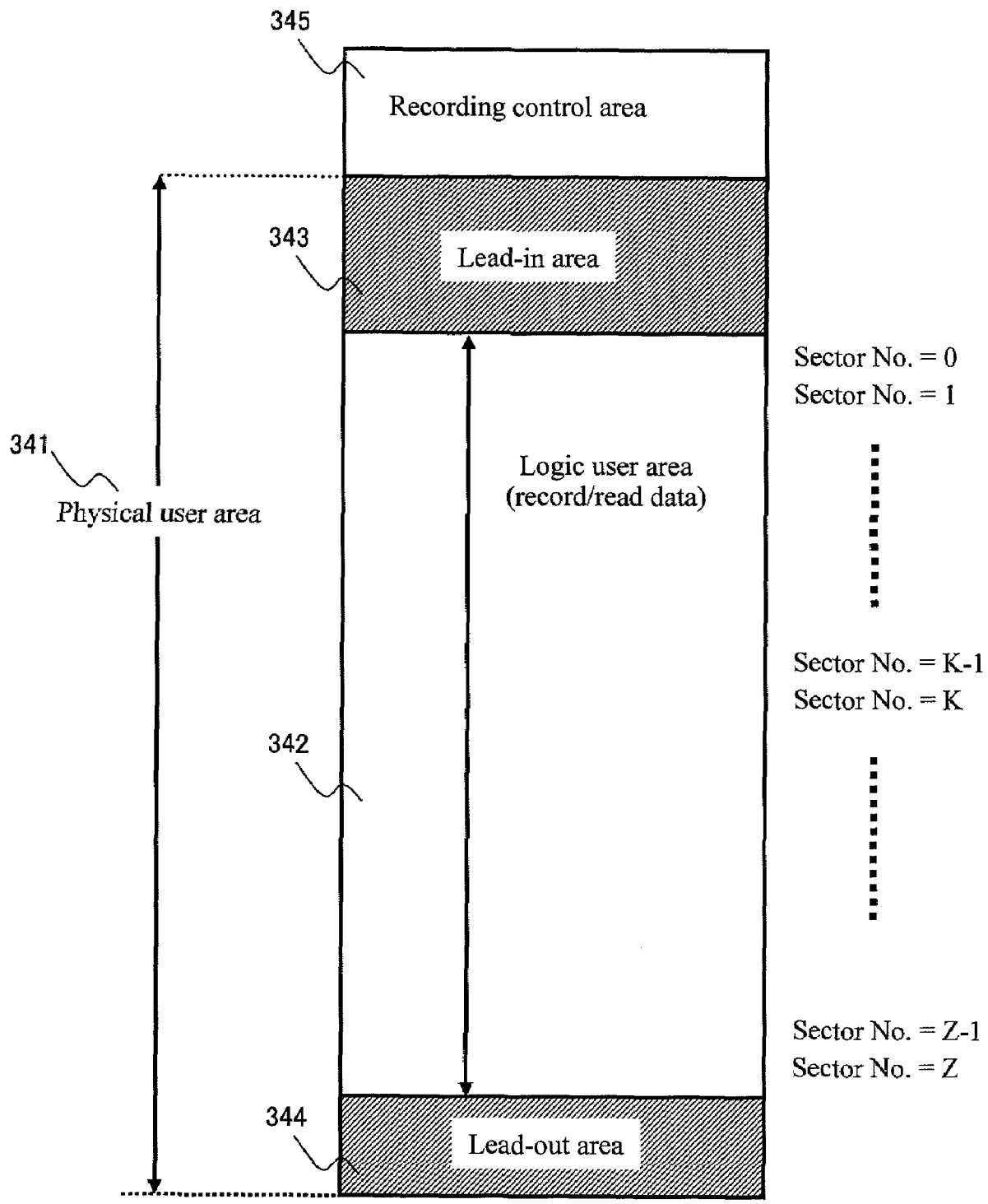
FIG. 34 is a drawing showing the structure of the user data region.

As shown in FIG. 34, the user data area contains a physical user data area 341 and a logic user data area 342. The entire physical user data area may be utilized as the functional area, or just the logic user data area may be used. The available recording density might be used up if the entire physical user data area is utilized so this area is preferably made a high density area. The lead-in area 343 and the lead-out area 344 however easily sustain damage when read (reproduced) frequently. The physical user data area on the other hand is not susceptible to damage but possesses a low density. The recording control area 345 is preferably in the functionless area.

(Information Record/Reproducing Method of this Invention)

Figure 4:
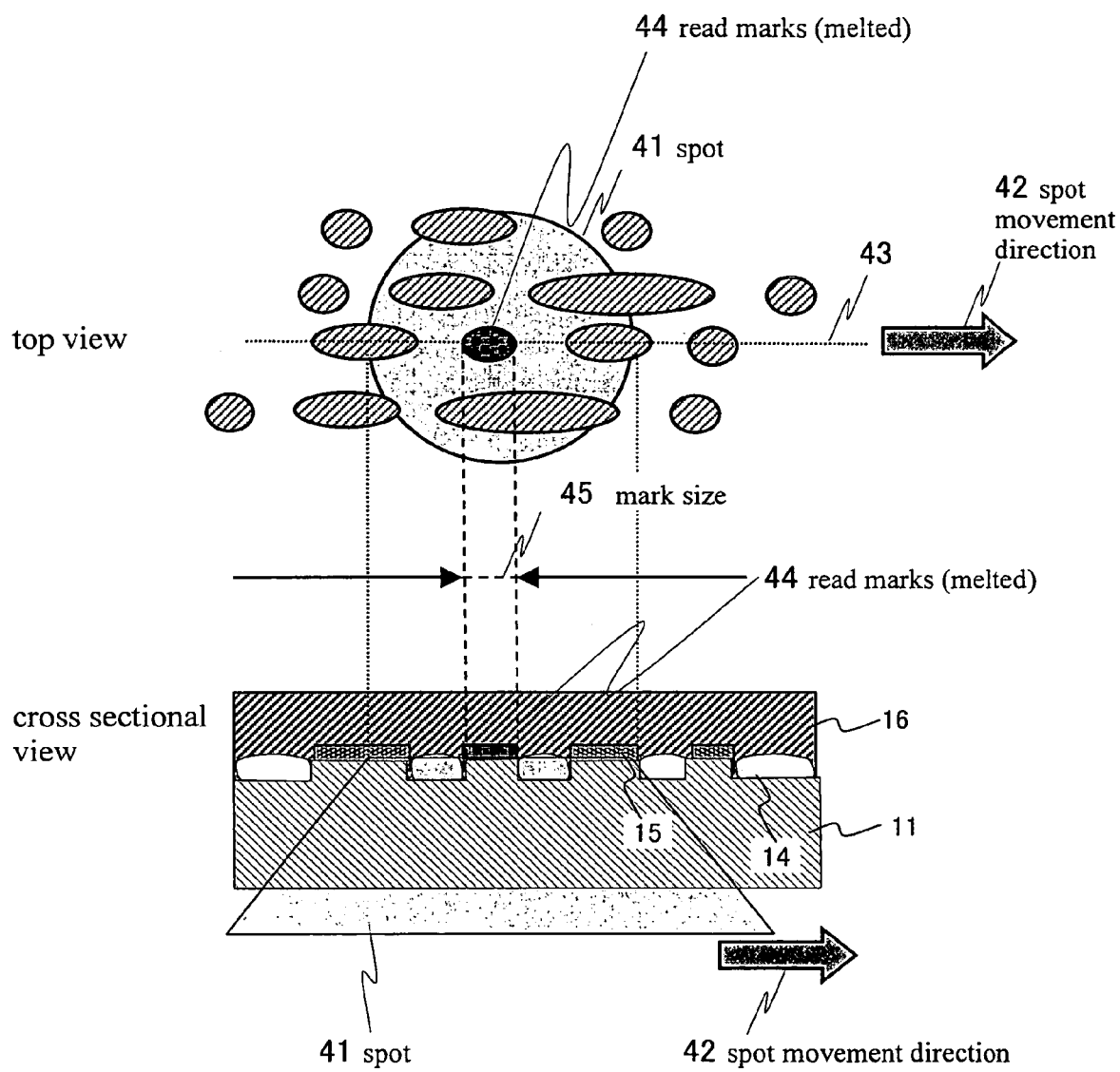
FIG. 4 is a concept drawing showing the principle of the reproduction (read) method of the first embodiment of this invention.

FIG. 4 shows a concept diagram of the recording mark reproduction (read) method for sizes formed below the diffraction limit on the medium of FIG. 1. The main elements of the read mark are comprised of Ge—Sb—Te, and a change in reflectivity occurs when melted from the crystallized state. To perform read (reproduction) a laser spot 41 is irradiated onto the recording mark 15 in the medium, the temperature in the center then reaches 540° C., just the recording mark melts within the center section, a change in reflectivity occurs, and a read mark 44 is formed. When the melted read mark exceeds the spot center, it crystallizes and returns to the original reflectivity (rate). The space structural material is below the melting point so no change in reflectivity occurs in the space 14 since there is no melting, even if the temperature exceeds 540° C. Moreover, even if this material should melt, no change in reflectivity will occur so there is no signal change. The change in signal amplitude only occurs in the mark section melted in this way at localized sections, so that read can be performed even on mark sizes at the normal diffraction limit. Moreover, the melted section has separated and material flow is less likely to occur so the number of signal deteriorations that might occur during a large number of read operations is an entire decimal place smaller than the case when the section is not separate. Therefore the effect is rendered that deterioration is less likely to occur.

Recording marks are therefore capable of being read (reproduced) even below the diffraction limit on the information recording medium and can be produced in large quantities at one time. Moreover, a medium can be obtained that contains ROM or WO marks in sizes below this type of optical diffraction limit.

(Combinations of Functional Materials B and C)

Results from changing the functional materials B or second material and C or third material, while utilizing $SiO_2$, $Al_2O_3$, Si, Pt as the functional material A or first material revealed the following. Preferably, Ge—Sb—Te, Ge—Te, Ge—Bi—Te, In—Sb—Te, Sb, Ge—Bi—Sb—Te, Ge—Sb—Te—O, and Ge—Sb—Te—N are utilized as B. Also, Au, Ag, Cu, Pt, Pd, Ni, Ir, Rh, Co, Os, Ru, Fe, Re, Mn, W, Mo, Cr, Ta, Nb, V, Hf, Zr, Ti, Zn, Al, and Si are preferably utilized as C. Utilizing these yielded the preferable effect that the surface energy of C was twice or more the surface energy of B.

The Ge—Sb—Te, within the functional material B is uniformly separated so that marks and space with satisfactory low noise characteristics are obtained. Utilizing Ge—Bi—Te is satisfactory since it yields a fast crystallizing speed after melting and raises the read speed. Ge—Te is satisfactory since it provides a large contrast but the sensitivity is not good during read. Sb yields a high SNR (signal-to-noise ratio) and possesses a large change ratio during melting. In—Sb—Te and Ge—Bi—Sb—Te possess a low melting temperature and good sensitivity during read. Ge—Sb—Te—O and Ge—Sb—Te—N are satisfactory due to high storage stability.

In the functional material C, the Au, Ag, Cu, Ni, Ir, Rh, Co, Os, and Ru were preferable because of separation even at low energy irradiation. Au was satisfactory in view of low noise characteristics. Ag and Co were satisfactory because they promoted crystallization in the functional material B. The Cu and Ni were satisfactory because of strong adhesive strength with the bottom layer and protective layer. The irradiation energy must be increased when Pt and Pd are utilized in the functional material C; however these possess excellent durability due to being stable after separation. Pt is even more preferable since it can form marks and spaces with a small particle size from 10 to 30 n. The Fe, Re, Mn, W, Mo, Cr, Ta, Nb, V, Hf, Zr, Ti, Zn, Al, and Si are preferable in view of their low material cost compared to gold (Au), etc. The W, Mo, Cr, Ta are preferable since they are hard and are not prone to cause deformation of the film in the medium during repeated melting and hardening of the functional material B after separation. Among these elements, the Zn, Al, and Si are even more inexpensive and preferable in view of their easy handling. After separation, the Fe, Re, Zr, Ti, V, and Hf possess optical characteristics close those of the functional material B during non-melting, and the signal fluctuation during melting and non-melting of the functional material is large, and are preferable in view of a high SNR (signal-to-noise ratio) during read (reproduction).

(Functional Material A)

Here an investigation on whether phase separation occurs was made while changing the functional material A utilizing Ge—Sb—Te in the functional material B, and Ag (silver) in the functional material C. Results that were obtained are shown in Table 2. The surface tension $\gamma_0$ of functional material B was 333 (mN/m), and the surface tension $\gamma_0$ of functional material C was 903 (mN/m). The melting points in this table were the melting temperature, or the temperature recorded when there was a large change in the surface shape formed to a glass state.

TABLE 2

| Functional material A | Surface tension $\gamma_0$ of A (mN/m) | Melting point of A (° C.) | Relation between surface tension $\gamma_0$ of functional material A, B, C (mN/m) | Separation |
|---|---|---|---|---|
| $SiO_2$ | 300 | 1550 | A < B < C | Separated |
| $Al_2O_3$ | 570 | 2049 | B < A < C | Separated |
| $Cr_2O_3$ | 600 | 2330 | B < A < C | Separated |
| $SnO_2$ | 600? | 1127 | B < A < C | Separated |
| Si | 865 | 1410 | B < C < A | Separated |
| Pt | 1800 | 1769 | B < C < A | Separated |

TABLE 2-continued

| Functional material A | Surface tension $\gamma_0$ of A (mN/m) | Melting point of A (°C.) | Relation between surface tension $\gamma_0$ of functional material A, B, C (mN/m) | Separation |
|---|---|---|---|---|
| ZnS—SiO$_2$ | 250 | 1550 | A < B < C | Separated |
| Ta—O | 600 | 1872 | B < A < C | Separated |
| Mixed glass | 300 | 570 | A < B < C | Separated |
| Polycarbonate | 700-750 | 140 | B < C < A | No separation |
| Sn | 544 | 232 | B < A < C | No separation |

The composition of the mixed glass in the table was SiO$_2$—Al$_2$O$_3$—Na$_2$O—MgO. These results shows that separation is achieved even if the surface energy of functional material A is larger, or smaller, than B, C or a value in between. The film (temperature) rises to 420° C. or more due to the energy irradiation, and therefore there was no separation when functional material A whose melting point is lower than 420° C. was utilized. In other words, it was found that the separation was not adequate when melting the functional material A by using energy irradiation to achieve separation.

In this embodiment, a polycarbonate substrate 11 including uneven sections matching the ROM patterns is utilized as the protective substrate. A substrate with uneven sections is a substrate with grooves deeper than atomic size on the entire surface or a portion of the substrate surface. Uneven sections (dents, projections) such as pits and grooves may be formed continuously on the circumference or may be divided on it. The size may differ according to the location. Besides polycarbonate, glass, polyolefin, ultraviolet light curing resin, and materials that do not transmit light such as silicon may also be utilized as the substrate.

In this embodiment, the substrates were mass-produced by injection molding however lasers or electron beams may be utilized to machine the glass or silicon, and it may also be formed by etching utilizing masks.

The treatment process for forming the surface of the second embodiment may be performed by nano-printing, and after applying the coating, defects may be removed by the energy beam.

Differences in surface roughness in the third embodiment may be formed by pressing a hard substance against a section of the surface to form marks, or an energy beam may be applied to melt the section of the substrate where the surface is rough and planarize it.

The surface state and the shape of the substrate 171, and the separated shape of the functional material B (172) and functional material C (173) are summarized in FIG. 17. The uneven sections as shown in (a) through (h), and surface processing differences 175, 176 as in (i), (j); and planarizing differences 177, 178 as shown in (K) may be formed in this way without particular restrictions on the fabrication method. Differences as in the trigger 174 need not be uniform in the marks and space, and if a trigger is present in a section then the separation has progressed. Therefore, finer processing is possible and finer (tinier) marks and spaces can be formed.

Second Embodiment

The second embodiment is described utilizing an example where a large quantity of recording marks are formed at once by means of differences in the surface energy, when a substrate different from that of the first embodiment is utilized.

(Information recording method and information recording medium of this invention)

Figure 5:
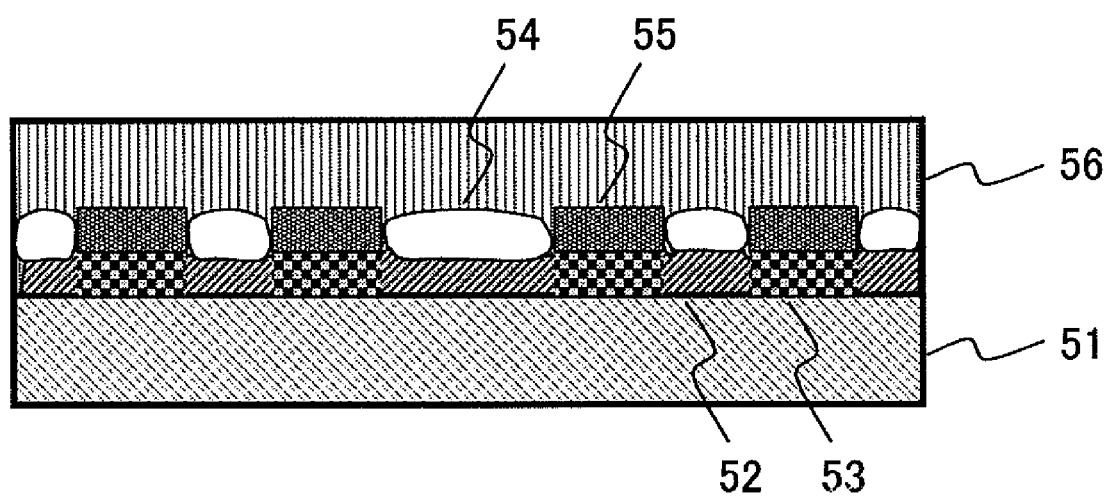
FIG. 5 is a cross sectional view of the medium of the second embodiment of this invention.

FIG. 5 is a cross sectional view of the disk information recording medium of the second embodiment of this invention. In this medium, a functional material C54 made from gold (Au) as the main element in the hydrophobic section 52, and a functional material B55 made from Ge—Sb—Te as the main element in the hydrophilic section 53, are separately formed on a substrate 51 forming a ROM pattern by chemical processing; and the surface covered by a protective substrate 56. Here, the spaces are gold (Au) and the marks are Ge—Sb—Te. The functional material C (54) possesses a curved surface with a large curvature compared to the functional material B (55).

Figure 6:
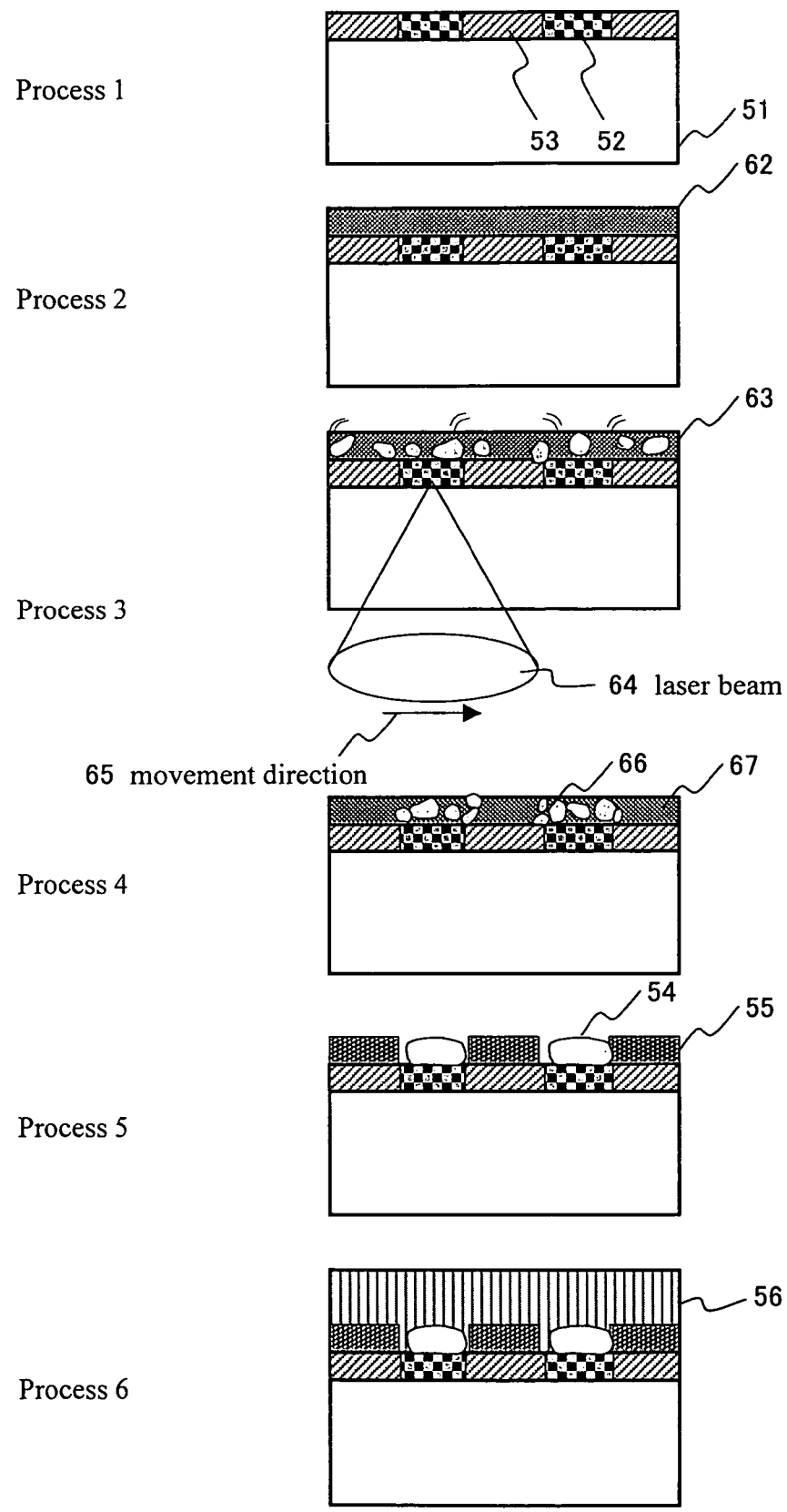
FIG. 6 is illustrations showing the recording mark production method of the second embodiment of this invention.

The recording marks are fabricated as described next. The method for forming the recording marks is shown in FIG. 6. First of all, the surface is covered with an SiO$_2$ film, and a recording mark forming film 62 made from Au-Ge—Sb—Te is deposited to 25 nm by sputtering, on a polycarbonate protective substrate 51 (process 1) that is 1.1 millimeters thick and 12 centimeters in diameter and chemically formed with ROM patterns on the outermost surface.

Afterwards, as process 3, a laser beam 64 was irradiated onto the recording mark forming film 62. Here, the recording mark forming film 62 marks was irradiated while moving the laser beam as shown by the movement direction 65. A sheet beam with a length of approximately 50 microns and a width of approximately 5 microns was utilized. The recording mark forming film material shown in the process 5 was separated due to the difference in surface energy on the film 63 irradiated by this energy, and this process forms spaces 54 of gold (Au) as the main element in the hydrophobic section, and recording marks 55 of Ge—Sb—Te as the main element in the hydrophilic section. The state from the process 3 to the process 5 is shown in process 4, in which the section 66 of Au as the main element, and the section 67 of Ge—Sb—Te as the main element are shown in the process of separation. After forming the recording marks in this way, the surface is protected with a protective substrate 56.

Recording marks capable of being read even below the diffraction limit on the information recording medium can be therefore produced in large quantities at one time. Moreover, a medium can be obtained that contains ROM or WO marks in sizes below this type of optical diffraction limit.

Those medium structures, material, information recording methods and information reproducing (read) methods, and equipment not described in this embodiment are identical to those in the first embodiment, and the third through tenth embodiments.

Third Embodiment

The third embodiment is described utilizing an example where a large quantity of recording marks are formed at one time by means of differences in the surface energy, when a substrate different from that of the first and second embodiments is utilized.

(Information Recording Method and Information Recording Medium of this Invention)

Figure 7:
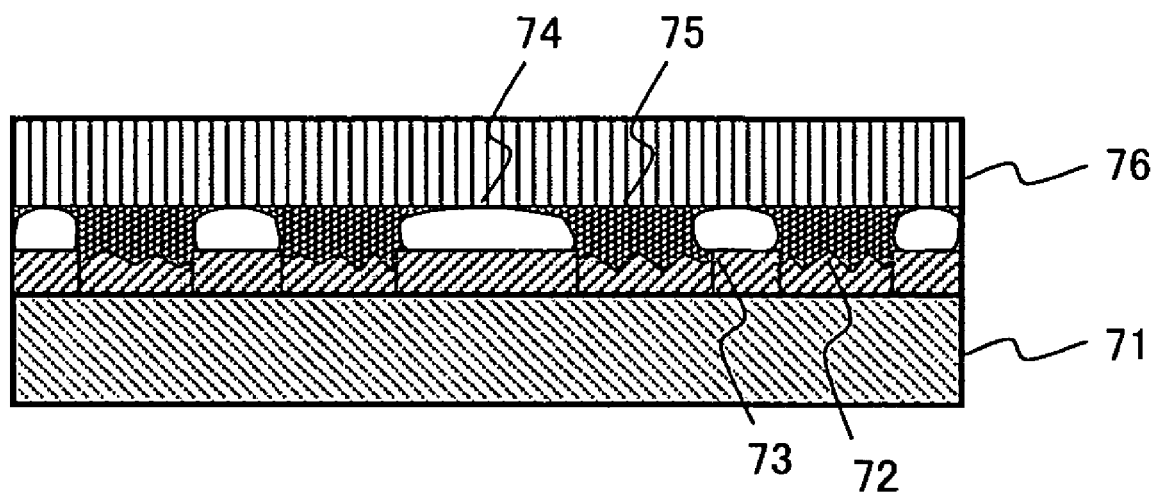
FIG. 7 is a cross sectional view of the medium of the third embodiment of this invention.

FIG. 7 is a cross sectional view of the disk information recording medium of the third embodiment of this invention. In this medium, a functional material 74 made from gold (Au) as the main element in the level section 73, and a functional material 75 made from Ge—Sb—Te as the main element in the rough section 72; are separately formed on a substrate 71 containing a rough ROM pattern on the surface; and the surface is covered by a protective layer 76. Here, the spaces are gold (Au) and the marks are Ge—Sb—Te.

Figure 8:
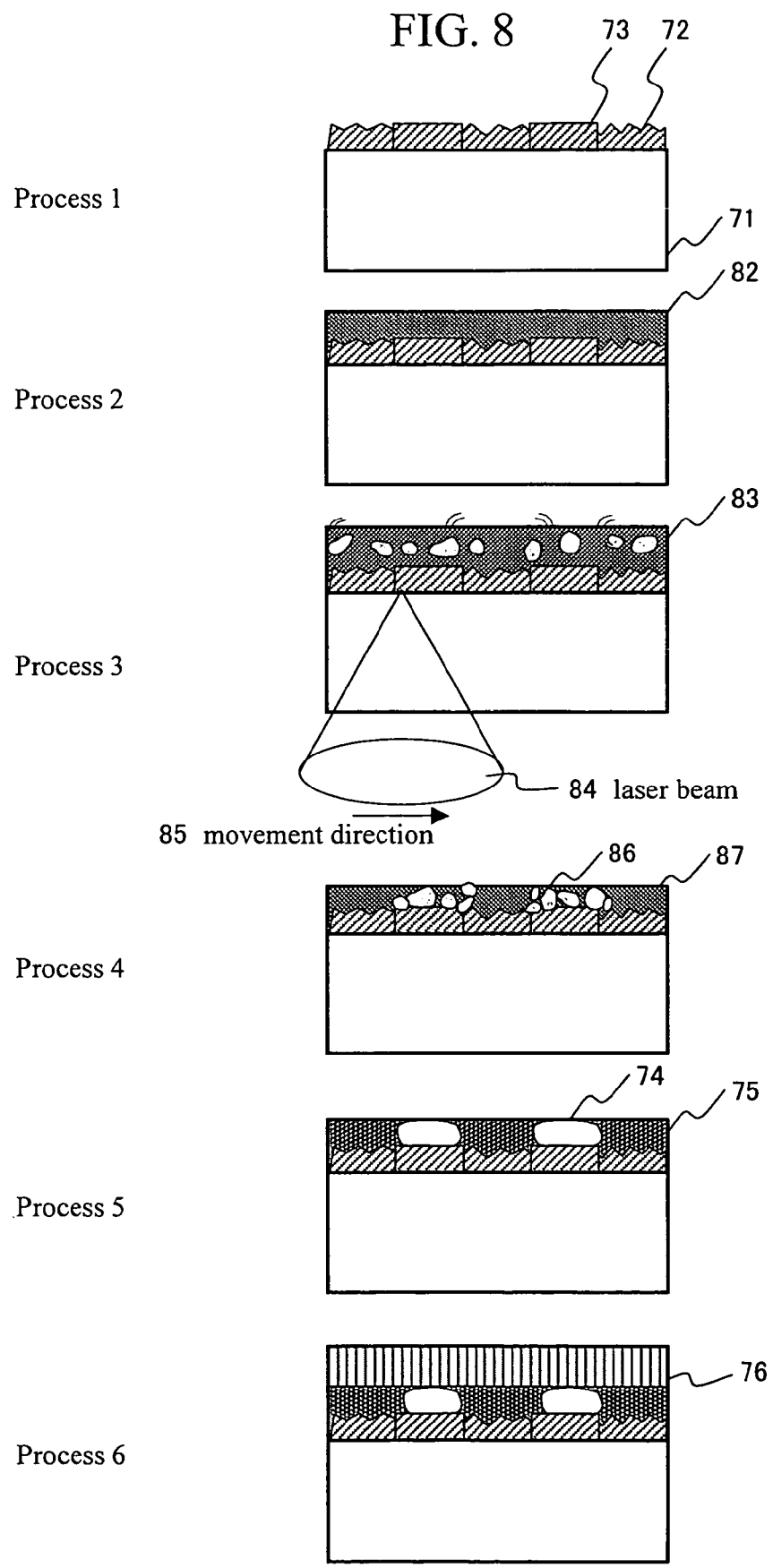
FIG. 8 is drawings of the recording mark production method of the third embodiment of this invention.

The recording marks were fabricated as described next. The method for forming the recording marks is shown in FIG. 8. First of all, and a recording mark forming film 82 made from Au—Ge—Sb—Te is deposited to 25 nm by sputtering, on a polycarbonate protective substrate 71 (process 1) that is 1.1 millimeters thick and 12 centimeters in diameter and its surface is covered with an $SiO_2$ film chemically formed with ROM patterns on the surface.

Afterwards, as process 3, a laser beam 84 was irradiated onto the recording mark forming film 82. Here, the recording mark forming film 82 was irradiated while moving the laser beam as shown by the movement direction 85. A sheet beam with a length of approximately 50 microns and a width of approximately 5 microns was utilized. The recording mark forming film material shown in the process 5 was separated due to the difference in surface energy on the film 83 irradiated by this energy, and this process forms spaces 74 of gold (Au) as the main element in the level section, and recording marks 75 of Ge—Sb—Te as the main element in the rough section. The state from the process 3 to the process 5 is shown in process 4, in which the section 86 of Au as the main element, and the section 87 of Ge—Sb—Te as the main element are shown in the process of separation. After forming the recording marks in this way, the surface is protected with a protective substrate 76.

Recording marks capable of being read even below the diffraction limit on the information recording medium can be therefore produced in large quantities at one time. Moreover, a medium can be obtained that contains ROM or WO marks in sizes below this type of optical diffraction limit.

Those medium structures, material, information recording methods and information reproducing (read) methods, and equipment not described in this embodiment are identical to those in the first and second embodiments, and the fourth through tenth embodiments.

Fourth Embodiment

The fourth embodiment is described utilizing an example where a large quantity of recording marks is formed at one time by the difference in the surface energy, when the marks and spaces are of different thicknesses and when the energy irradiation methods are different.

(Information Recording Method and Information Recording Medium of this Invention)

Figure 10:
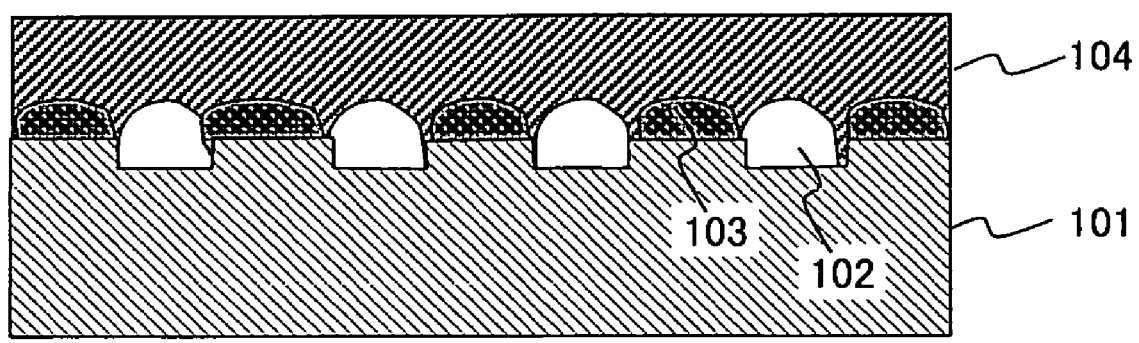
FIG. 10 is a cross sectional view of the medium of the fourth embodiment of this invention.

FIG. 10 is a cross sectional view of the disk information recording medium of the fourth embodiment of this invention. In this medium, a functional material C102 made from gold (Au) as the main element in the dents, and a functional material B 103 made from Ge—Sb—Te as the main element in the projections are separately formed on a substrate 101 that contains uneven section ROM patterns on the surface; and the surface is covered by a protective film 104. Here, the spaces are gold (Au) and the marks are Ge—Sb—Te. The functional material C102 possesses a curved surface with a large curvature compared to the functional material B103. Measuring the thicknesses of the functional materials revealed that the thickness DH of the functional material C is thicker than the functional material B. When both materials are of different thicknesses, the production yield is improved by means of the next process. Irregularities in the alignment were reduced during forming of the protective substrate, and the production yield was improved.

(Effect)

Figure 11:
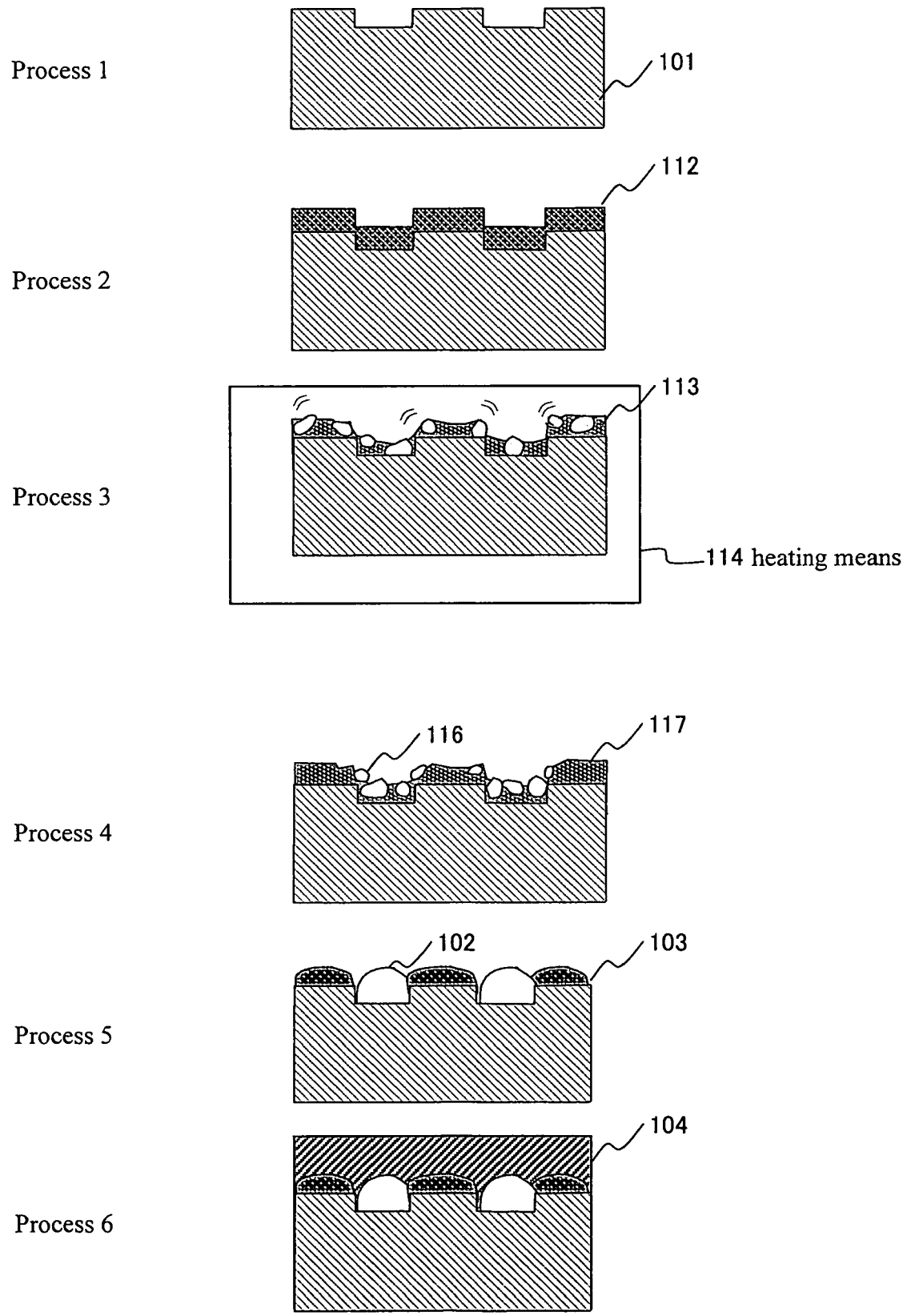
FIG. 11 is drawings of the recording mark production method of the fourth embodiment of this invention.

The recording marks were fabricated as described next. The method for forming the recording marks is shown in FIG. 11. First of all, a recording mark forming film 112 made from Pd—Sn is deposited to 25 nm by sputtering, on a substrate 121 (process 1) that is 1.1 millimeters thick and 12 centimeters in diameter with uneven section ROM patterns on the surface, The recording mark forming film 112 was then heated in a heating means 114. An electric furnace was utilized here (as the heating means). The electric furnace is capable of heating large quantities at one time and is ideal for mass production. The recording mark forming film material 113 as shown in the process 5, is separated due to the difference in surface energy by this process. This process forms spaces 102 of gold (Au) as the main element in the dents, and recording marks 103 of Ge—Sb—Te as the main element in the projections. The state from the process 3 to the process 5 is shown in process 4, in which the section 116 of Au as the main element, and the section 117 of Ge—Sb—Te as the main element are shown in the process of separation. After forming the recording marks in this way, the surface is protected with a protective substrate 104.

Recording marks capable of being read even below the diffraction limit on the information recording medium can be therefore produced in large quantities at one time. Moreover, a medium can be obtained that contains ROM or WO marks in sizes below this type of optical diffraction limit.

Those medium structures, material, information recording methods and information reproducing (read) methods, and equipment not described in this embodiment are identical to those in the first through third embodiments, and the fifth through tenth embodiments.

Fifth Embodiment

The fifth embodiment is described utilizing an example where a large quantity of recording marks is formed at one time by the difference in surface energy, when the role of the marks and spaces is different.

(Information Recording Method and Information Recording Medium of this Invention)

Figure 12:
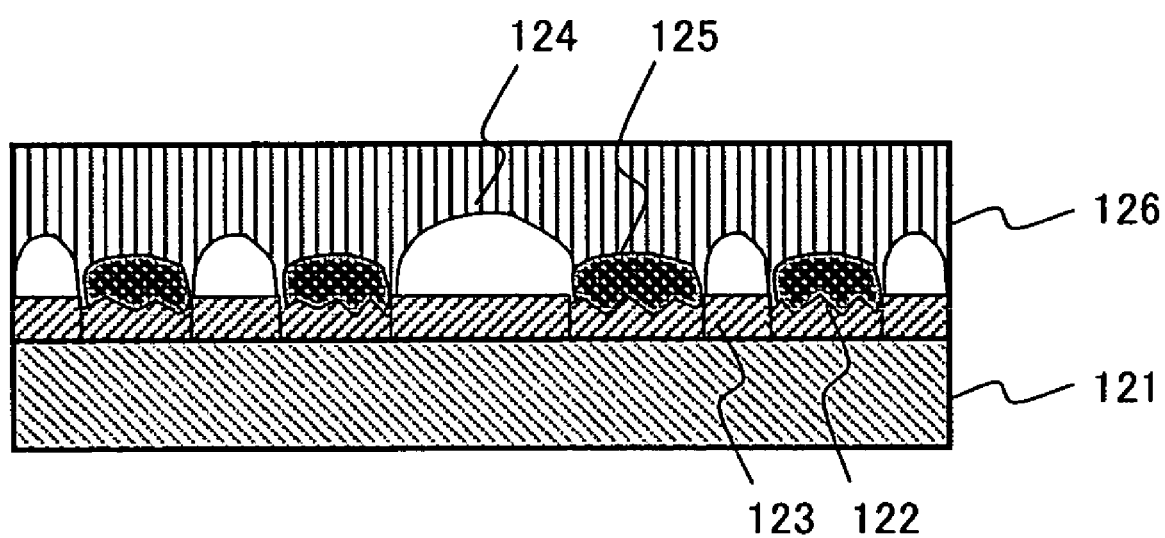
FIG. 12 is a cross sectional view of the medium of the fifth embodiment of this invention.

FIG. 12 is a cross sectional view of the disk information recording medium of the fifth embodiment of this invention.

In this medium, a functional material C125 made from palladium (Pd) as the main element in the rough section 122, and a functional material B124 made from tin (Sn) as the main element in the level section 123 are separately formed on a substrate 121 containing a ROM pattern by different surface roughness on the surface; and the surface is covered by a protective substrate 126. Here, the spaces are tin (Sn) and the marks are palladium (Pd).

Figure 13:
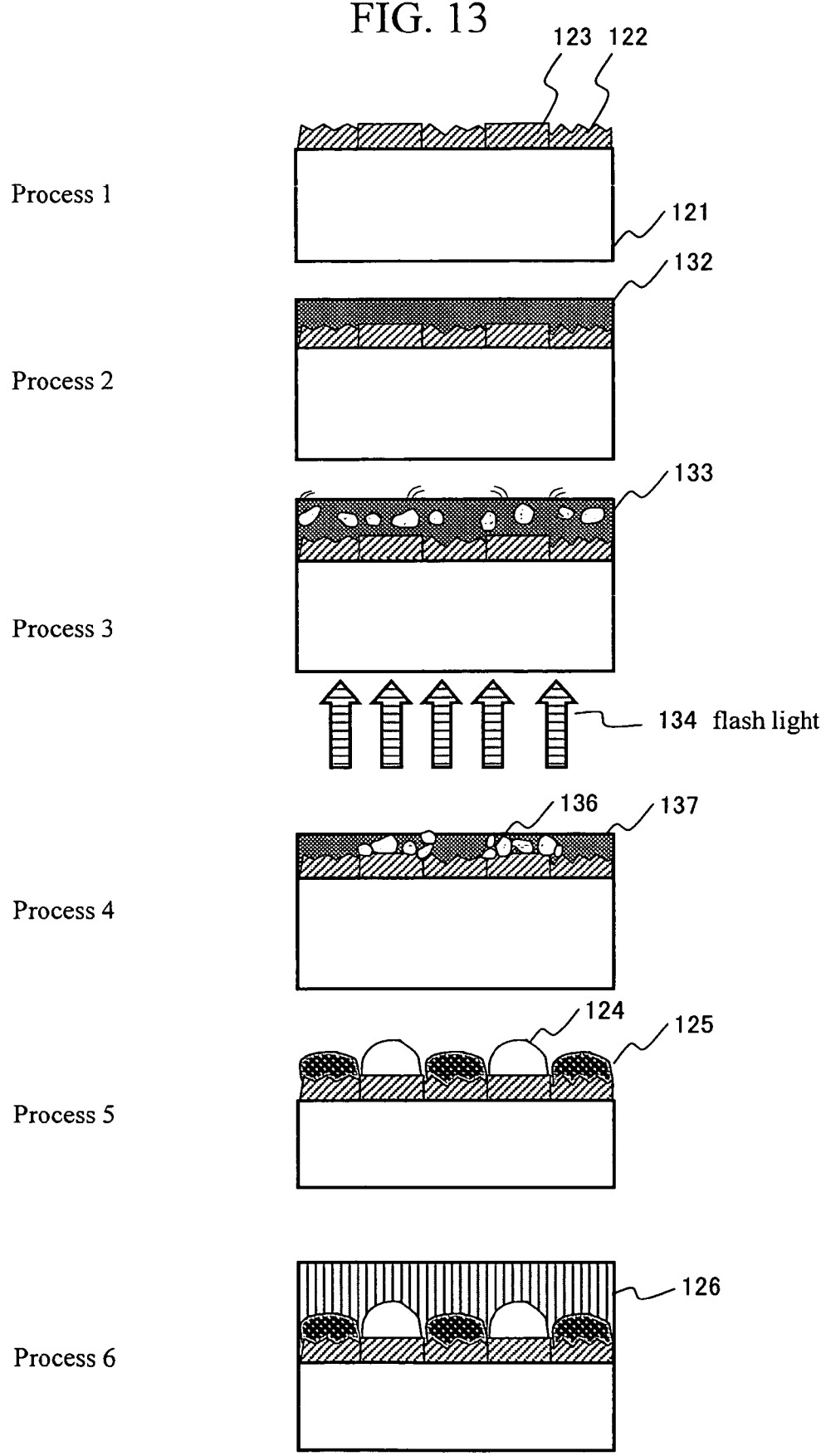
FIG. 13 is a drawing of the recording mark production method of the fifth embodiment of this invention.

The recording marks were fabricated as described next. The method for forming the recording marks is shown in FIG. 13. First of all, a recording mark forming film 132 made from Pd—Sn is deposited to 25 nm by sputtering, on a substrate 121 (process 1), that is 1.1 millimeters thick and 12 centimeters in diameter with ROM patterns by different roughness on the surface, and covered by $Al_2O_3$. Afterwards, as the third process, a Xenon flash light 134 was irradiated onto the recording mark forming film 132. There is a high amount of energy so a cover must be installed on the equipment to prevent light from leaking outside. However, the emission of one flash of light can be accomplished within one second, and if multiple lamps are prepared then an area 12 centimeters in diameter can be processed at one time by irradiation so that this method is excellent for mass production.

In this process, the energy-irradiated film 133 is separated into marks 125 made from palladium (Pd) as the main element in the rough section, and spaces 124 made from tin (Sn) as the main element in the level section by means of the difference in the surface energy in the recording mark forming film material as shown in the process 5. The state from the process 3 to the process 5 is shown in process 4, in which a section 125 made from Pd (palladium) as the main element, and section 124 made from tin (Sn) as the main element are shown in the process of separation. After forming these recording marks in this way, the surface is protected with a protective substrate 126.

Among these processes, the process 2 can be accomplished in 1 to 10 seconds, and the processes 3 through 5 in 1 second, so that the time for forming the recording marks can be drastically shortened.

(Information Reproducing Method of this Invention)

Figure 20:
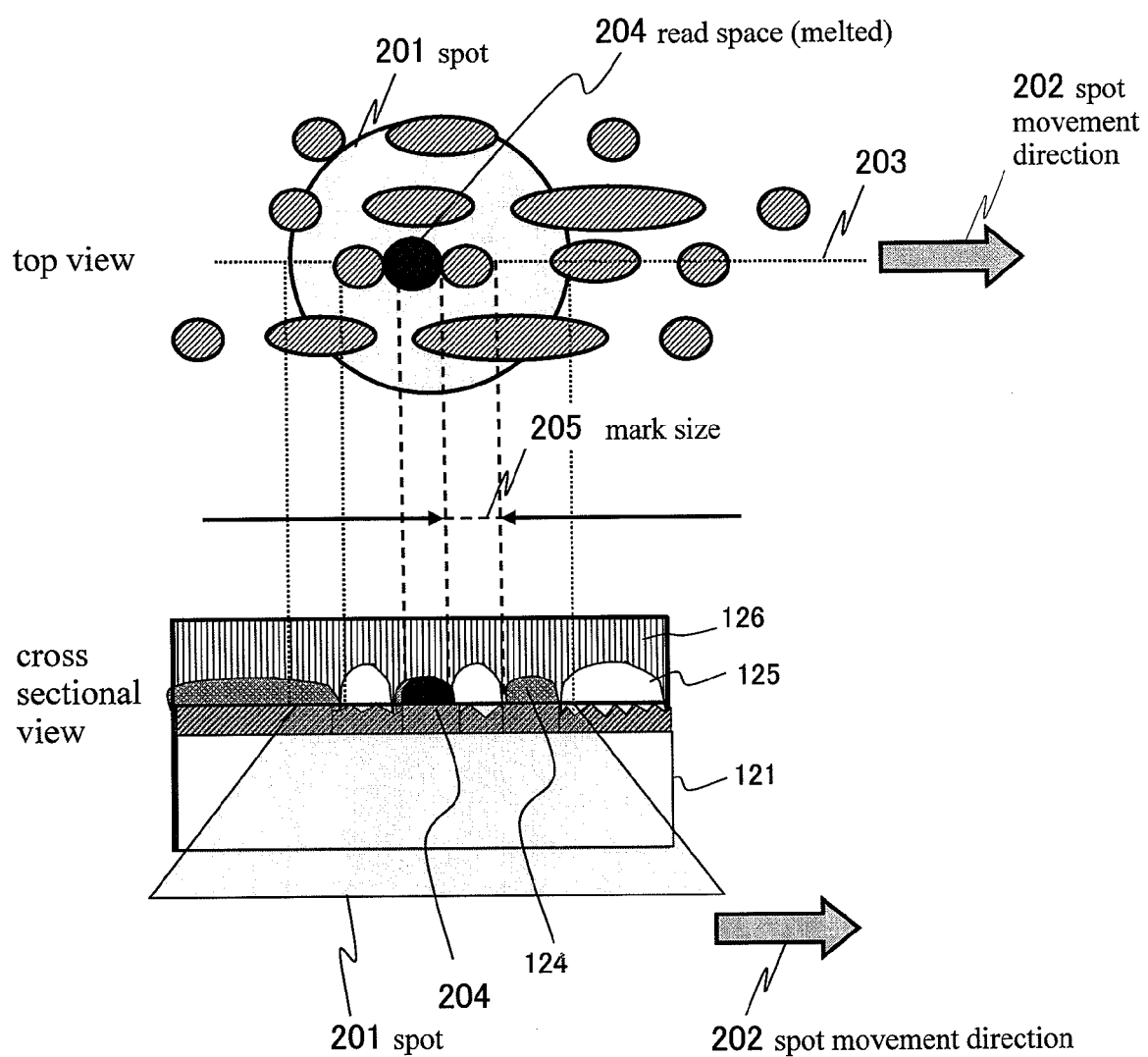
FIG. 20 is a flat view of recording mark placement in the ninth embodiment of this invention.

The reading (reproducing) method for recording marks formed on this medium at a size below diffraction limit is shown in the concept diagram in FIG. 20. The main element of the read spaces 124 is tin (Sn), and the reflectivity changes when melting occurs after the crystallized state. In order to perform read (reproduction) a laser spot 201 is irradiated onto the recording mark 125 and the space 124 in the medium, the temperature in the center then becomes higher than 300° C., and just the space 204 melts within the center section so that a change in reflectivity occurs, and when this melted space exceeds the spot center, crystallization occurs and the space returns to the original reflectivity (rate). The melting point of the read mark on the other hand is above the melting point of the space structural material so no change in reflectivity occurs there even if the temperature exceeds 300° C. Moreover, even if this material should melt, no change in reflectivity will occur so there is no signal change. This change in reflectivity only occurs in the space section locally melted in this way, and causes a difference in signal amplitude to occur due to the difference in reflectivity between the marks and spaces so that read is possible even at mark sizes at the normal diffraction limit. In this method, no separation occurs in the melted area so that though there are fewer read operations compared to when separation occurs, this method has the advantage of high signal intensity due to the change in reflectivity caused by melting in a wide surface area.

Recording marks are therefore capable of being read (reproduced) even below the diffraction limit on the information recording medium and can be produced in large quantities at one time. Moreover, a medium can be obtained that contains ROM or WO marks in sizes below this type of optical diffraction limit.

Those medium structures, material, information recording methods and information reproducing (read) methods, and equipment not described in this embodiment are identical to those in the first through fourth embodiments, and the sixth through tenth embodiments.

Sixth Embodiment

The sixth embodiment is described utilizing an example where a large quantity of recording marks is formed at one time by the difference in the surface energy, when reading from the aligned substrate side.

(Information recording method and information recording medium of this invention)

Figure 14:
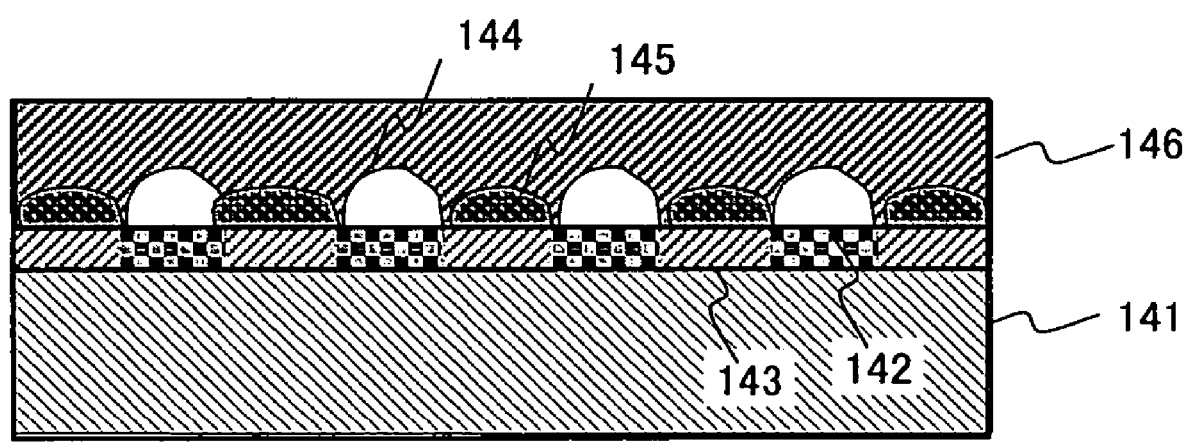
FIG. 14 is a cross sectional view of the medium of the sixth embodiment of this invention.

FIG. 14 is a cross sectional structural view of the disk information recording medium of the sixth embodiment of this invention. In this medium, a functional material C144 made from cobalt (Co) as the main element in the hydrophobic section 142, and a functional material B145 made from Ge—Sb—Te as the main element in the hydrophilic section 143 are separately formed on a substrate 141 containing ROM patterns chemically formed on the surface; and the surface is covered by a protective substrate 146. Here, the marks are cobalt (Co) and the spaces are Ge—Sb—Te. The functional material C (144) possesses a curved surface with a large curvature compared to the functional material B (145).

Figure 15:
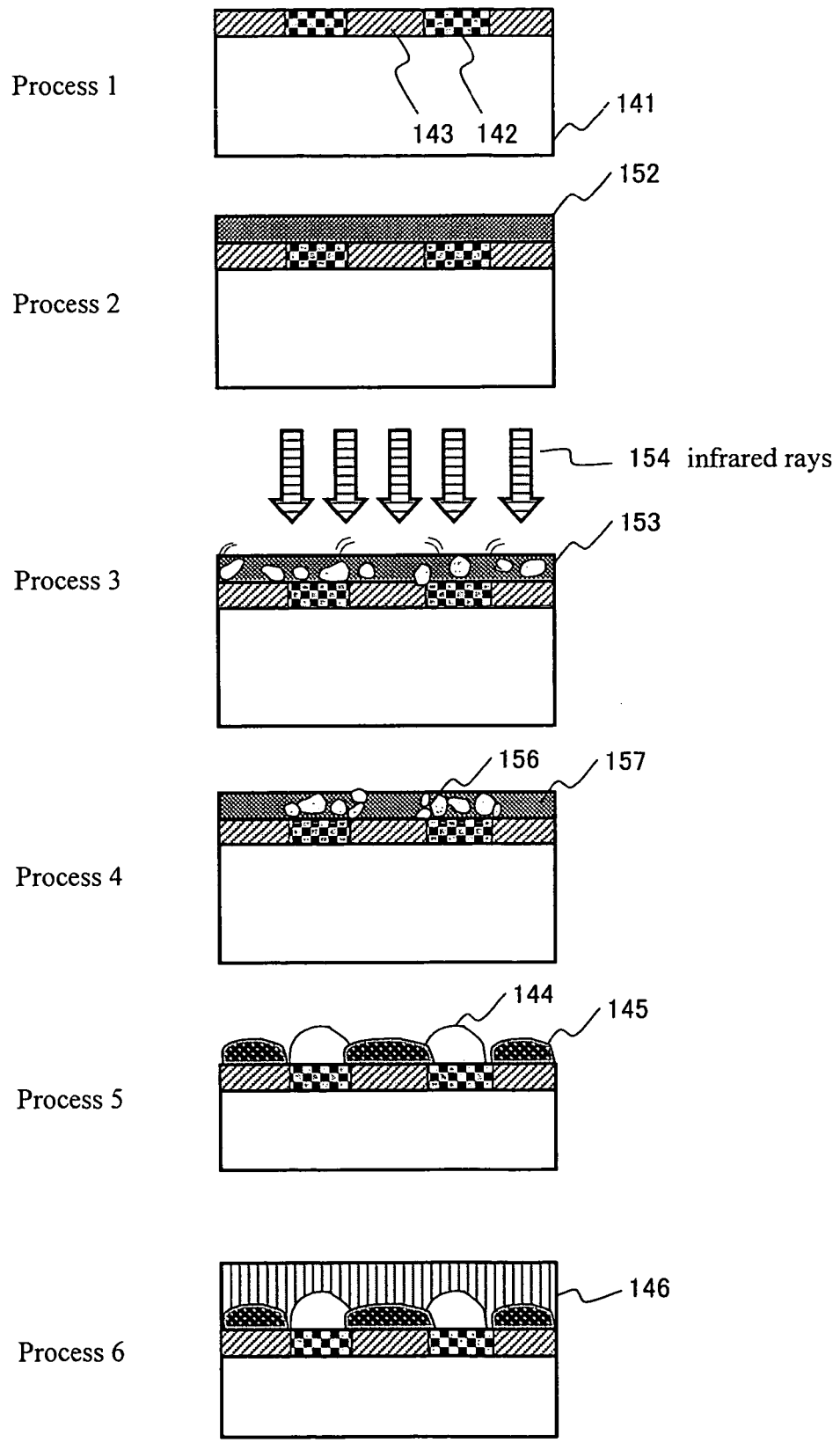
FIG. 15 is a drawing of the recording mark production method of the sixth embodiment of this invention.

The recording marks were fabricated as described next. The method for forming the recording marks is shown in FIG. 15. First of all, a recording mark forming film 152 made from Co—Ge—Sb—Te is deposited to 25 nm by sputtering, on a silicon substrate 141 (process 1), that is 1.1 millimeters thick and 12 centimeters in diameter and chemically formed with ROM patterns on the surface. Infrared rays 154 are then irradiated onto the recording mark forming film 152 as the process 3. This method requires a somewhat long amount of time since the energy is low, however the heating is not intense so the uniformity after separation is excellent.

In this process, the energy-irradiated film 153 is formed into marks 144 made from cobalt (Co) as the main element in the hydrophobic section, and spaces 145 made from Ge—Sb—Te as the main element in the hydrophilic section, that are separated by the difference in surface energy of the recording mark forming film material as shown in process 5. The state from the process 3 to the process 5 is shown by process 4. Here the section 156 comprised of cobalt (Co) as the main element, and the section 157 comprised of Ge—Sb—Te as the main element are shown in the process of separating. After forming the recording marks in this way, the protective substrate 146 was formed to protect the surface.

Among these processes, the process 2 can be accomplished in 1 to 10 seconds, and the processes 3 through 5 in 10 minutes, so that the time for forming the recording marks can be drastically shortened.

(Information Reproducing Method of this Invention)

Figure 16:
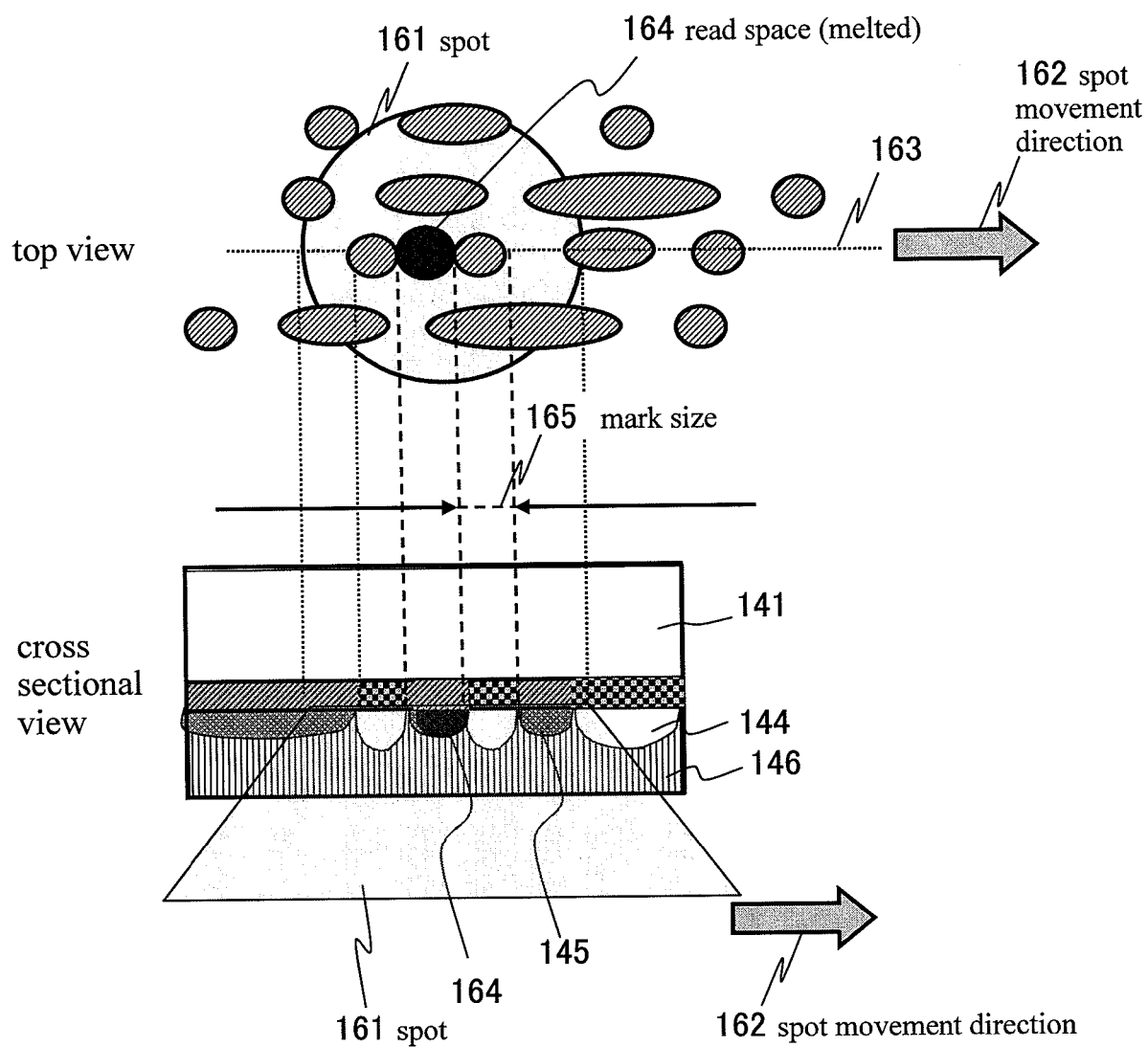
FIG. 16 is a concept drawing showing the principle of the reproduction (read) method of the sixth embodiment of this invention.

The reading (reproducing) method for forming recording marks formed on this medium at a size below diffraction limit is shown in the concept diagram in FIG. 16. Here, laser irradiation for reading was performed from the protective substrate 146 side. The main element of the read spaces 164 is Ge—Sb—Te, and a change in reflectivity occurs when it melts after the crystallized state. In order to perform read (reproduction) a laser spot 161 is irradiated onto the space 145 in the medium. The temperature in the center then becomes higher than 540° C., and just the space mark melts within the center section causing a change in reflectivity and forming the read space 164. When this melted read space exceeds the spot center, the reflecyivity returns to that of the original crystallized state. No change in the reflectivity rate of mark 144 occurs because there is no melting, even if the temperature of the space structural material exceeds 540° C. Moreover, even if this material should melt, no change in reflectivity will occur so there is no signal change. This change in signal amplitude only occurs in the space section locally melted in this way so that even sizes of marks and spaces at the usual diffraction limit can be read.

By performing read from the protective substrate side in this way, a material with low transmittance such as silicon (Si) can be utilized for the substrate. Moreover, utilizing a material with a mirror surface such as silicon render the advantage of low noise during read.

Recording marks can therefore be read (reproduced) even below the diffraction limit on the information recording medium and can be produced in large quantities at one time. Moreover, a medium can be obtained that contains ROM or WO marks in sizes below this type of optical diffraction limit.

Those medium structures, material, information recording methods and information reproducing (read) methods, and equipment not described in this embodiment are identical to those in the first through fifth embodiments, and the seventh through tenth embodiments.

Seventh Embodiment

The seventh embodiment is described utilizing an example where a large quantity of recording marks is formed at one time by the difference in the surface energy, when the energy irradiation method is different.

(Information Recording Method and Information Recording Medium of this Invention)

Figure 30:
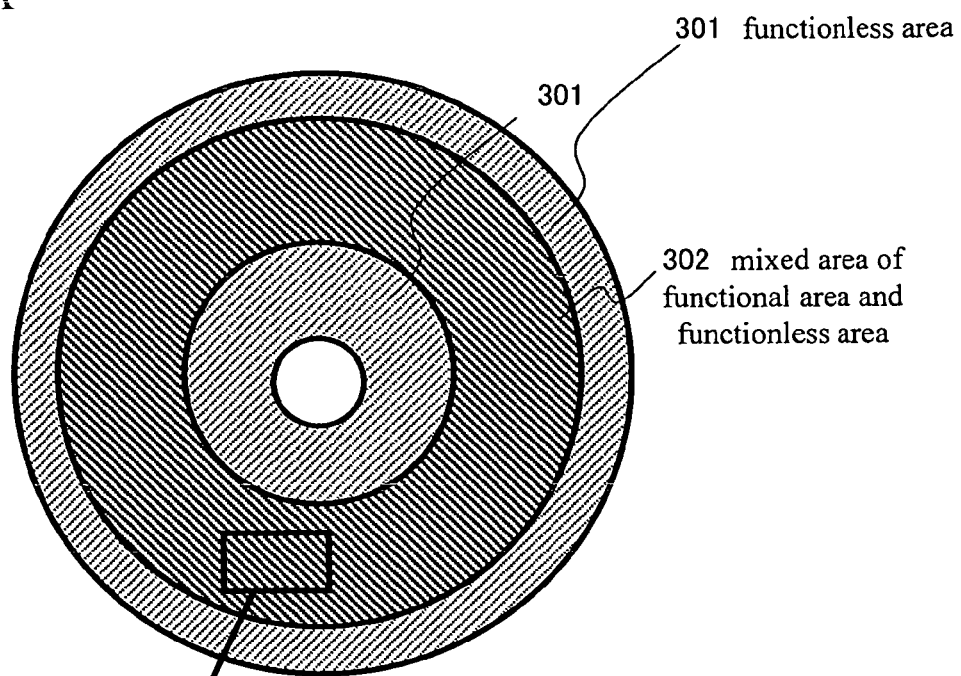
FIG. 30 is a flat view and a detailed view showing the functional area within the medium of this invention.
Figure 30:
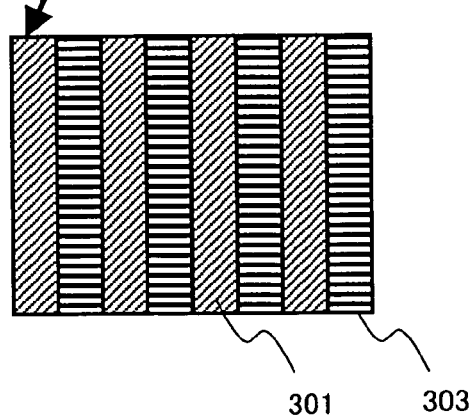

In FIG. 2 of the first embodiment, a spot beam approximately 0.4 microns in diameter was utilized as the laser beam 24 instead of the sheet beam in the process 3. Utilizing this beam allows machining a narrower area only. More specifically, as shown in FIG. 30, the functional area and the functionless area can be formed within a narrow area within one micron. In FIG. 30, (a) is the overall drawing for the detailed description. A mixed area 302 made up of the functional area and functionless area, and the functionless area 301 is formed in this way. In the same figure, (b) is an enlargement of the mixed area 302. The functionless area 301 and the functional area 303 are formed in a narrow area by the spot beam. In this case, a time that is approximately 100 times longer than the process 3 is required compared to when using a sheet beam. If multiple beams from two lasers are used then this time can be reduced to approximately 50 times, and if multiple beams from three lasers or more are used then this time can be reduced to approximately 30 times.

Those medium structures, material, information recording methods and information reproducing (read) methods, and equipment not described in this embodiment are identical to those in the first through sixth embodiments, and the eighth through tenth embodiments.

Eighth Embodiment

The eighth embodiment is described utilizing an example where a large quantity of recording marks is formed at one time by the difference in the surface energy, when the energy irradiation method is different.

(Information Recording Method and Information Recording Medium of this Invention)

In FIG. 2 of the first embodiment, an electron beam approximately 30 nanometers in diameter was utilized instead of the laser beam 24 in the process 3. Utilizing this beam allows machining just a narrower area. More specifically, as shown in FIG. 30, the functional area and the functionless area can be formed within a narrow area within approximately 50 nanometers. In this case, the processing in the process 3 requires (more) time compared to when using the sheet beam.

Those medium structures, material, information recording methods and information reproducing (read) methods, and equipment not described in this embodiment are identical to those in the first through seventh embodiments, and the ninth and tenth embodiments.

Ninth Embodiment

The ninth embodiment is described utilizing another example for forming a large quantity of recording marks at one time by the difference in the surface energy.

(Information recording method and information recording medium of this invention)

Figure 18:
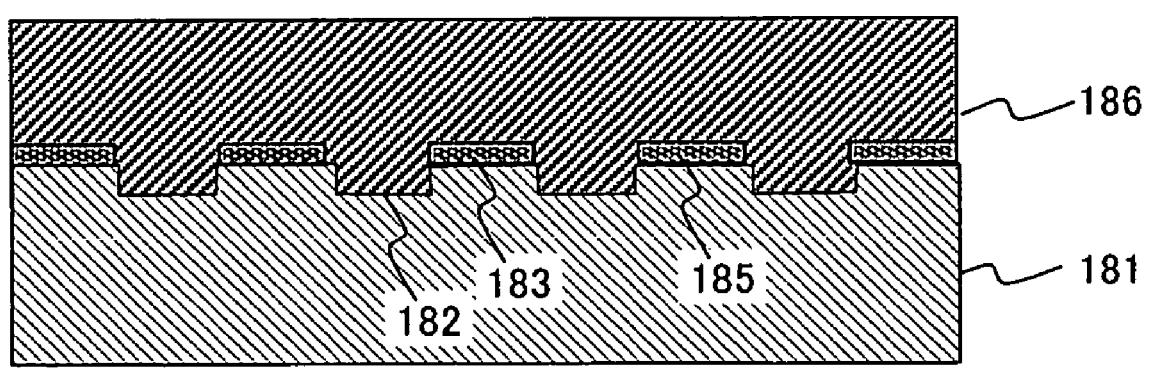
FIG. 18 is a cross sectional view of the medium of the ninth embodiment of this invention.

FIG. 18 is a cross sectional structural view of the disk information recording medium of the ninth embodiment of this invention. In this medium, there is a functional material 185 made from Ge—Sb—Te as the main element in the projections 183, and no film in the dents 182, on a substrate 181 containing uneven ROM patterns on the surface. The surface is a structure covered by the protective substrate 186. Here, the marks are Ge—Sb—Te, and there is no recording film on the spaces.

Figure 19:
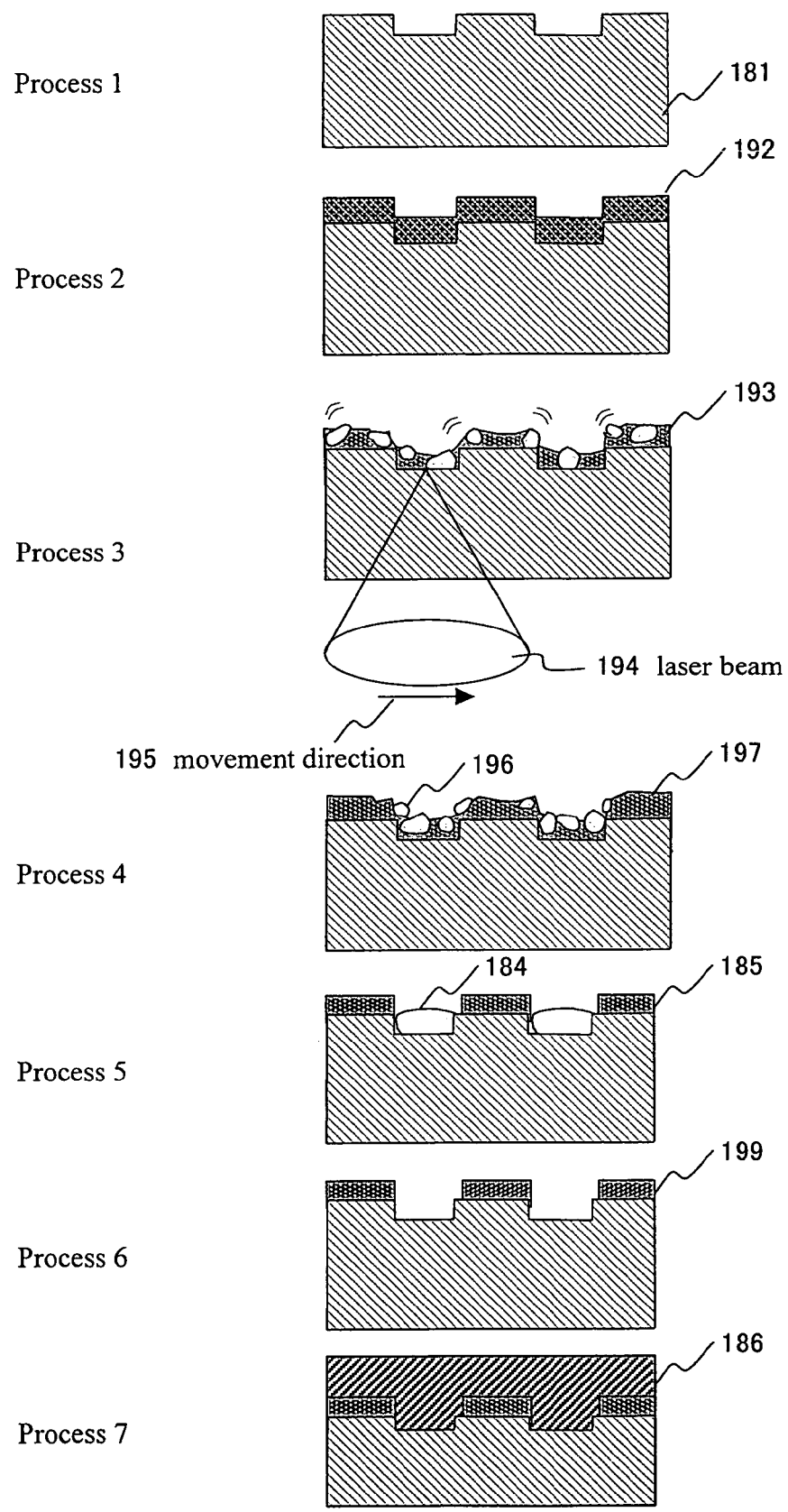
FIG. 19 is a drawing of the recording mark production method of the ninth embodiment of this invention.
Figure 22:
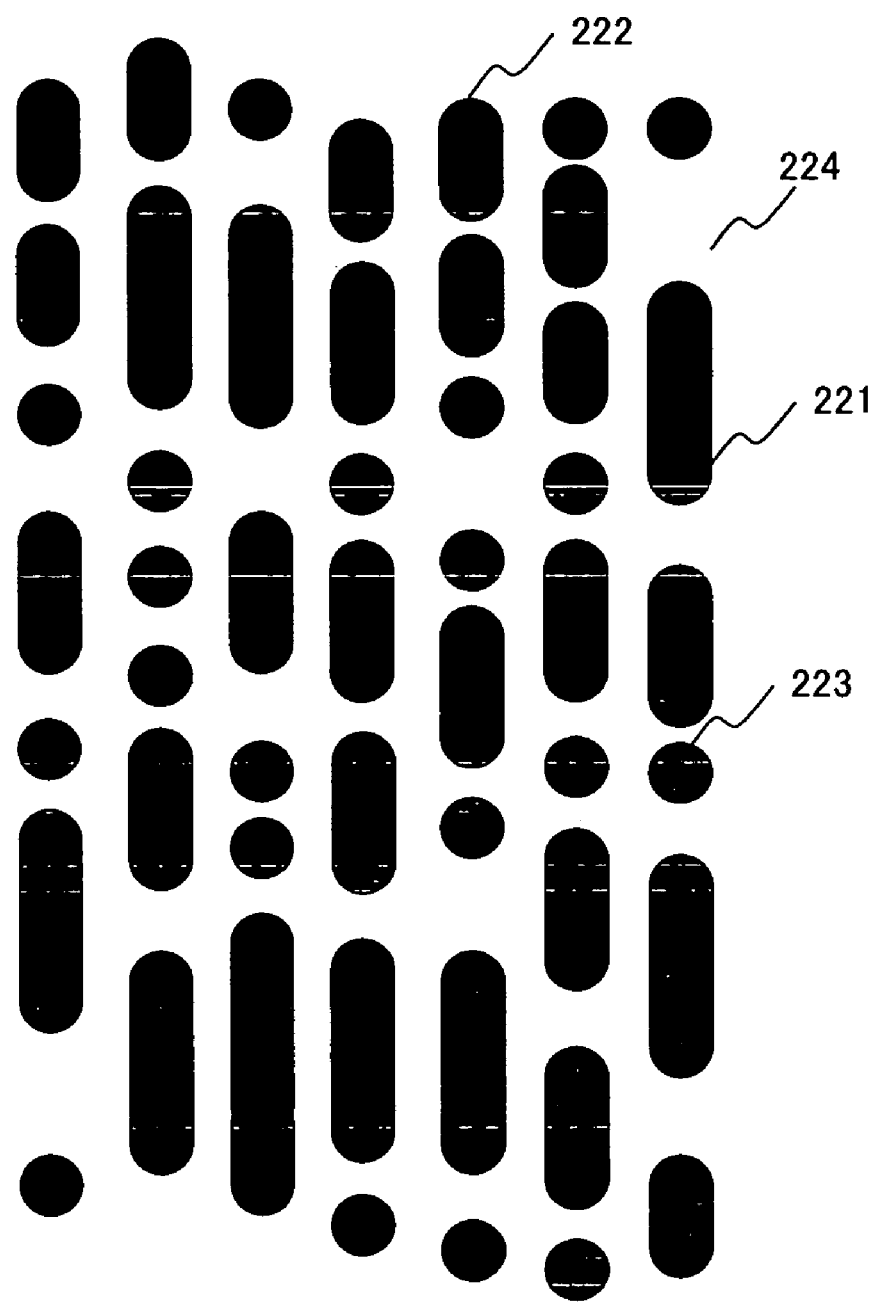
FIG. 22 is a flat view of recording mark placement in the ninth embodiment of this invention.

The recording marks were fabricated as described next. The recording mark production method is shown in FIG. 19. First of all, a recording mark forming film 192 of Au-Ge—Sb—Te was deposited to 10 nanometers by sputtering on a polycarbonate protective substrate 181 (process 1) that is 1.1 millimeters thick and 12 centimeters in diameter and containing uneven ROM patterns on the surface; and covered by $SiO_2$ film. A laser beam 194 was then irradiated onto the recording mark forming film 192 as the process 3. Here, the laser beam was moved during the irradiation in the direction of movement as shown by the moving direction 195. A sheet beam of approximately 5 microns in width and approximately 50 microns long was utilized as the laser (beam). The recording mark forming film material shown in the process 5 separates due to the difference in surface energy on the film 193 irradiated by this energy, and this process forms spaces 184 made from gold (Au) as the main element in the dents, and recording marks 185 made from Ge—Sb—Te as the main element in the projections. The state from the process 3 to the process 5 is shown in process 4, in which the section 196 of gold (Au) as the main element, and the section 197 of Ge—Sb—Te as the main element are shown in the process of separation. Next, in process 6, the space 184 made from Au is stripped away by etching, and only the recording marks left remaining. After forming the recording marks, the surface was protected by a protective substrate 186. An example of a recording mark and space layout is shown in FIG. 22. Film is present in the recording marks 221, 222, and 223 but there is no film in the space 224.

Figure 23:
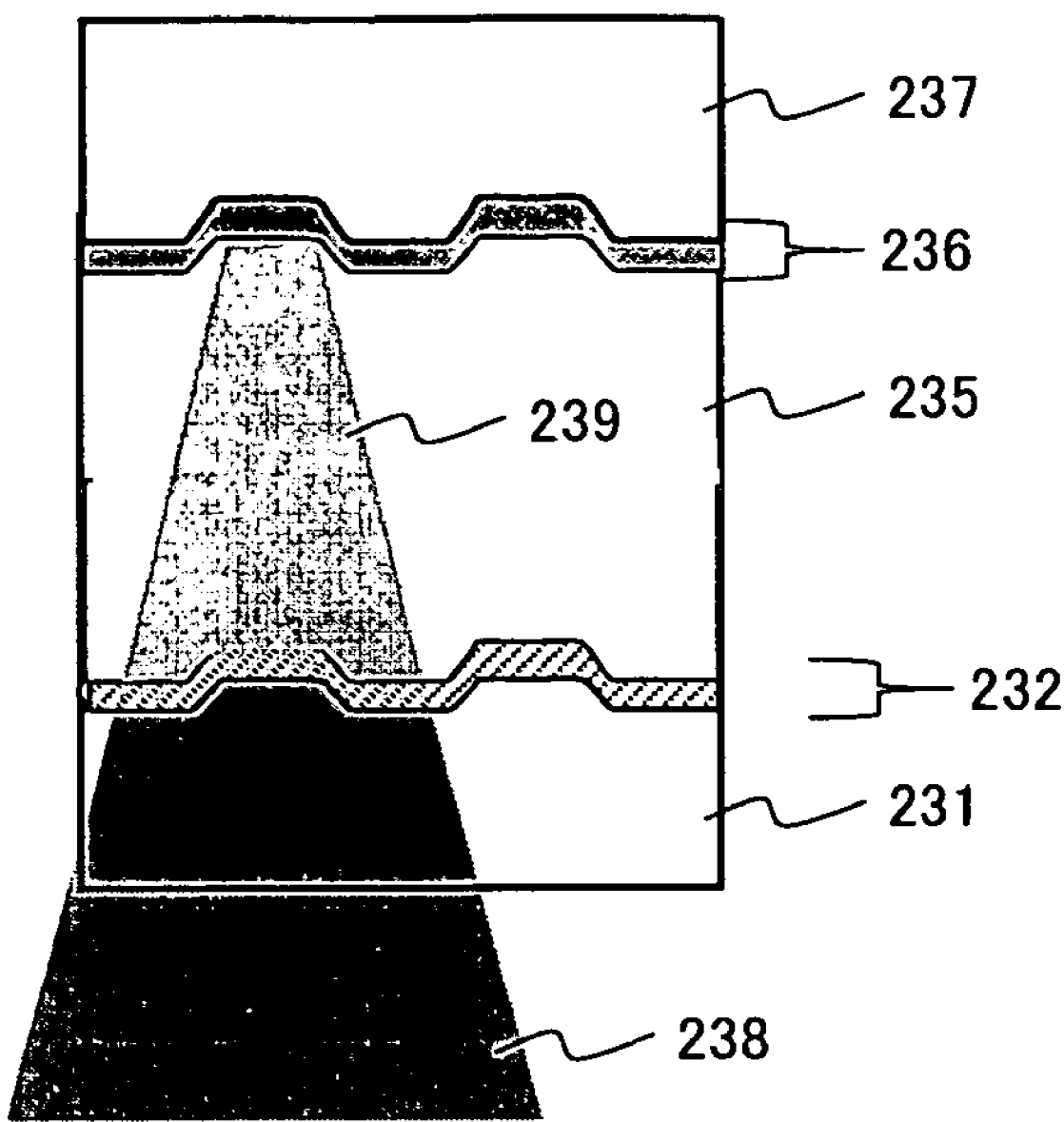
FIG. 23 is a cross sectional view of the multilayer medium of the ninth embodiment of this invention.

When only the recording marks remain, and the film is removed from the spaces, the area absorbed in the film become approximately one-third, and so the average absorption rate becomes approximately one-third, improving the average transmittance. FIG. 23 shows the case when this film is utilized on the light input side in multilayer medium. This (embodiment) can be applied to multilayer mediums of two or more layers but for purposes of simplicity in the description is limited here to an example with two layers. The structure of the multilayer medium is comprised of a substrate 231, an information surface 232 on the light input side, a spacer layer 235, an information surface 236 on the inner side, and a protective substrate 237. The information surface 232 on the light input side is comprised of recording marks and spaces, and there is no recording film or reflecting film in the spaces so that the absorption rate declines compared to the marks. Since the transmittance is large on the light input side, the laser 238 is emitted to the inner layer 236 in state 239 with virtually no weakening of the light intensity even after the light has transmitted through the information surface 232 on the light input side.

The laser emission intensity towards the inner layers becomes strong due to the large transmittance (or transmission factor), and a large reflectivity is also obtained from the inner layers. A large signal intensity can therefore be obtained, and a signal with a larger SNR could be obtained from the multilayer medium of the related art. If a large SNR is linked to increasing the number of layers then, the capacity can also be increased.

Recording marks can therefore be read (reproduced) even below the diffraction limit on the information recording medium and can be produced in large quantities at one time. A medium can in this way be obtained that contains ROM or WO marks in sizes below this type of optical signal diffraction limit.

Those medium structures, material, information recording methods and information reproducing (read) methods, and equipment not described in this embodiment are identical to those in the first through eighth embodiments, and the tenth embodiments.

Tenth Embodiment

The tenth embodiment is described utilizing another example for forming a large quantity of areas with recording film at one time by the difference in the surface energy.

(Information Recording Method and Information Recording Medium of this Invention)

Figure 24:
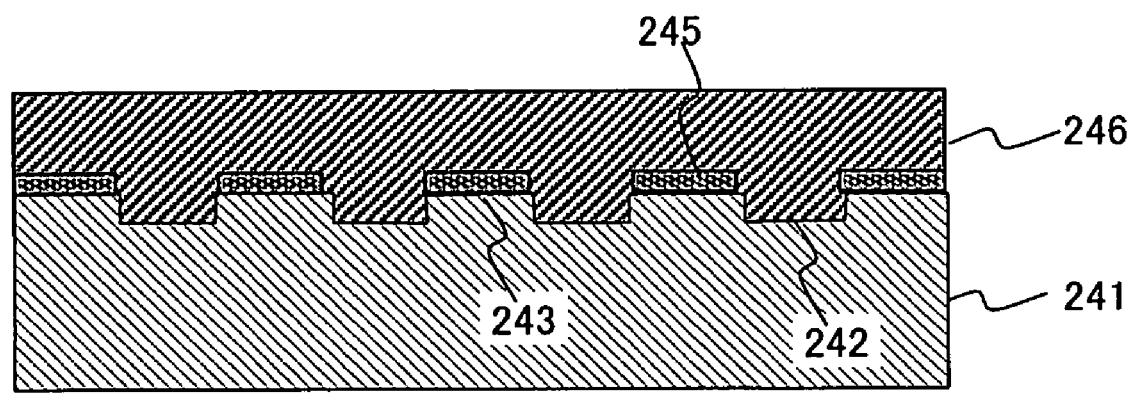
FIG. 24 is a cross sectional view of the medium of the tenth embodiment of this invention.

FIG. 24 is a cross sectional structural view of the disk information recording medium of the tenth embodiment of this invention. In this medium, there is a functional material 245 made from Ge—Sb—Te as the main element in the projections 243, and no film in the dents 242, on a substrate 241 containing uneven section grooves on the surface. The surface is a structure covered by the protective substrate 246. Here, the lands are Ge—Sb—Te, and there is no recording film on the grooves.

Figure 25:
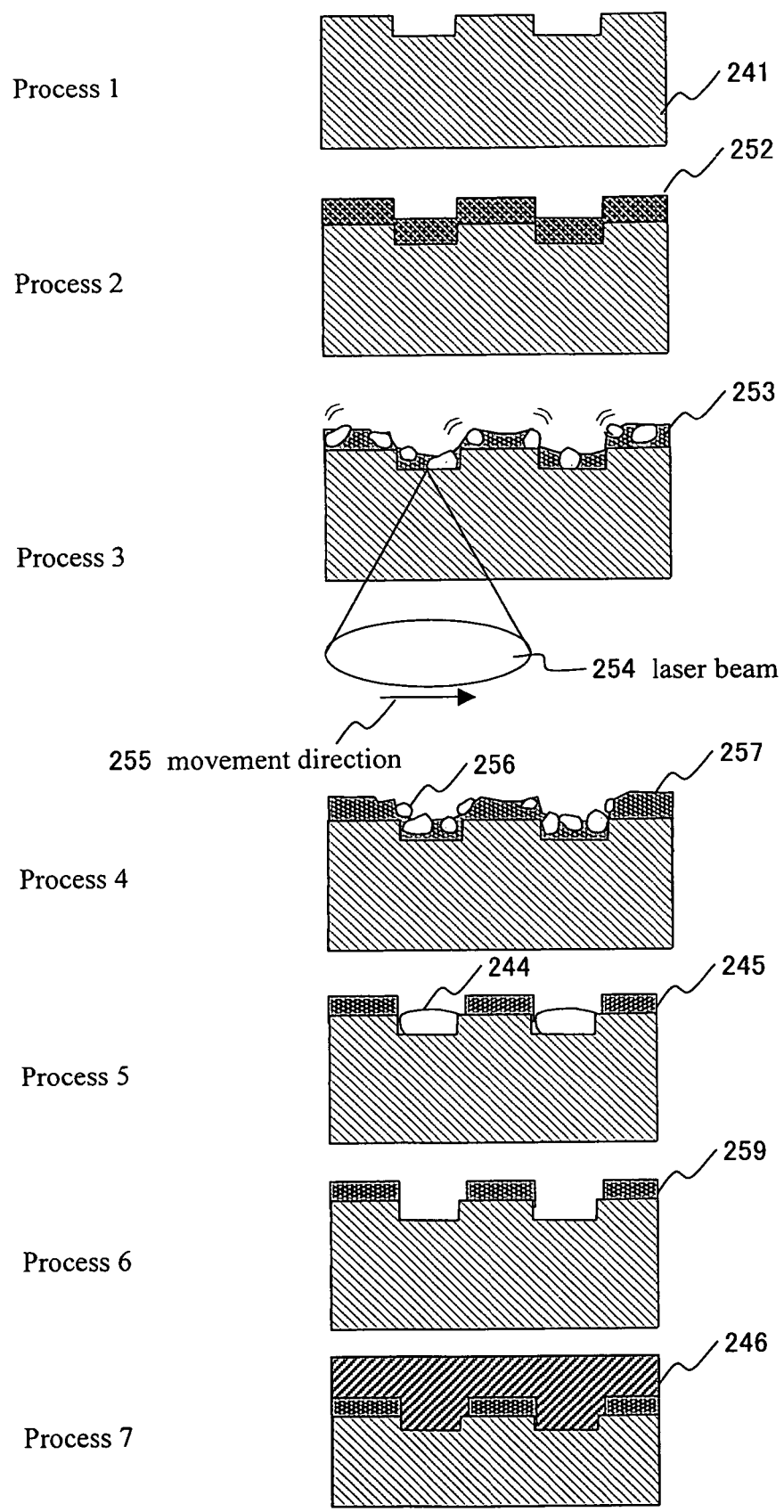
FIG. 25 is a drawing of the recording mark production method of the tenth embodiment of this invention.
Figure 26:
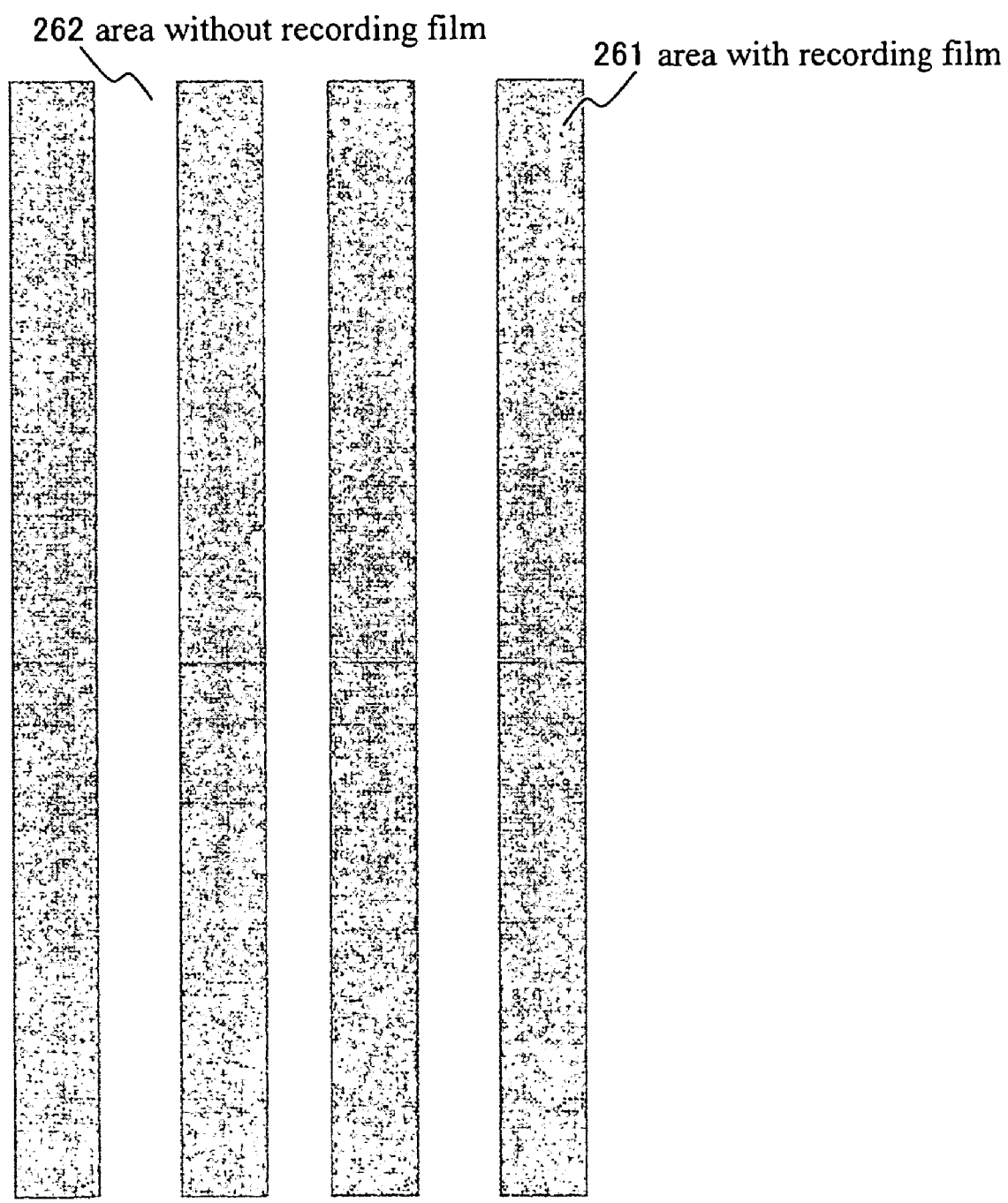
FIG. 26 is a flat view showing the placement of the functional material of the tenth embodiment of this invention.
Figure 28:
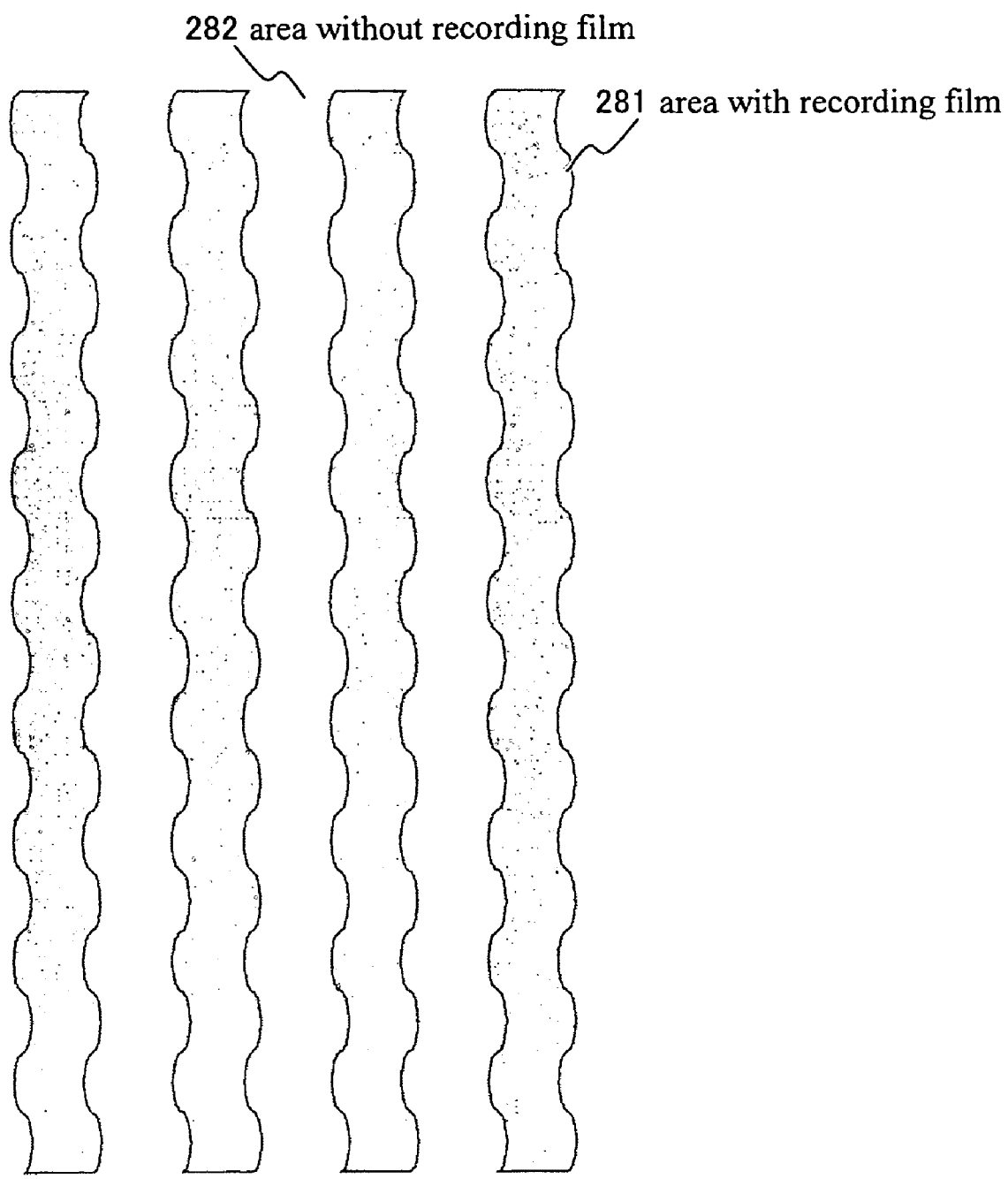
FIG. 28 is a flat view showing the placement of the functional material when the groove shape is different for the tenth embodiment of this invention.

Areas with recording film were fabricated as shown next. The method for forming the areas containing recording is shown in FIG. 25. First of all, a forming film for area with recording film 252 of Au—Ge—Sb—Te was deposited to 25 nanometers by sputtering on a 1.1 millimeter thick polycarbonate protective substrate 241 (process 1) with a diameter of 12 centimeters containing uneven section grooves on the surface. Next, as the process 3, a laser beam 254 was irradiated onto the recording film area forming film 252. The laser beam was moved during the irradiation in the direction of movement as shown by the moving direction 255. A sheet beam of approximately 5 microns in width and approximately 50 microns long was utilized as the laser (beam). The irradiated film 253 irradiated by energy is separated by the difference in surface energy in the recording mark forming film material as shown in process 5, and grooves 244 made from gold (Au) as the main element in the dents, and an area with recording film 245 made from Ge—Sb—Te as the main element in the projections are formed. The state from the process 3 to the process 5 is shown in process 4, in which the section comprised of section 256 of gold (Au) as the main element, and the section 257 of Ge—Sb—Te as the main element are shown in the process of separation. Next, in process 6, the grooves 244 made from Au are stripped away by etching, and only the area with recording film left remaining. A flat view of this area with recording film is shown in FIG. 26 and FIG. 28. The areas with recording film 261, 281, and the areas without recording film 262, 282 are formed along the groove shapes. After forming the area with recording film, the surface was protected by a protective substrate 246.

When only the recording marks are left remaining, and the film is removed from the remaining sections, the absorbing area in the film becomes approximately one-half, so that the average absorption rate becomes approximately one-half, and the average transmittance is therefore improved. When this film was utilized on the light input side of the multilayer medium, a large signal intensity can be obtained from the inner layers because the transmittance on the light input side is large, and a signal intensity larger than that of the multilayer medium of the related art was obtained. If a large SNR is linked to increasing the number of layers then, the capacity can also be increased.

Figure 27:
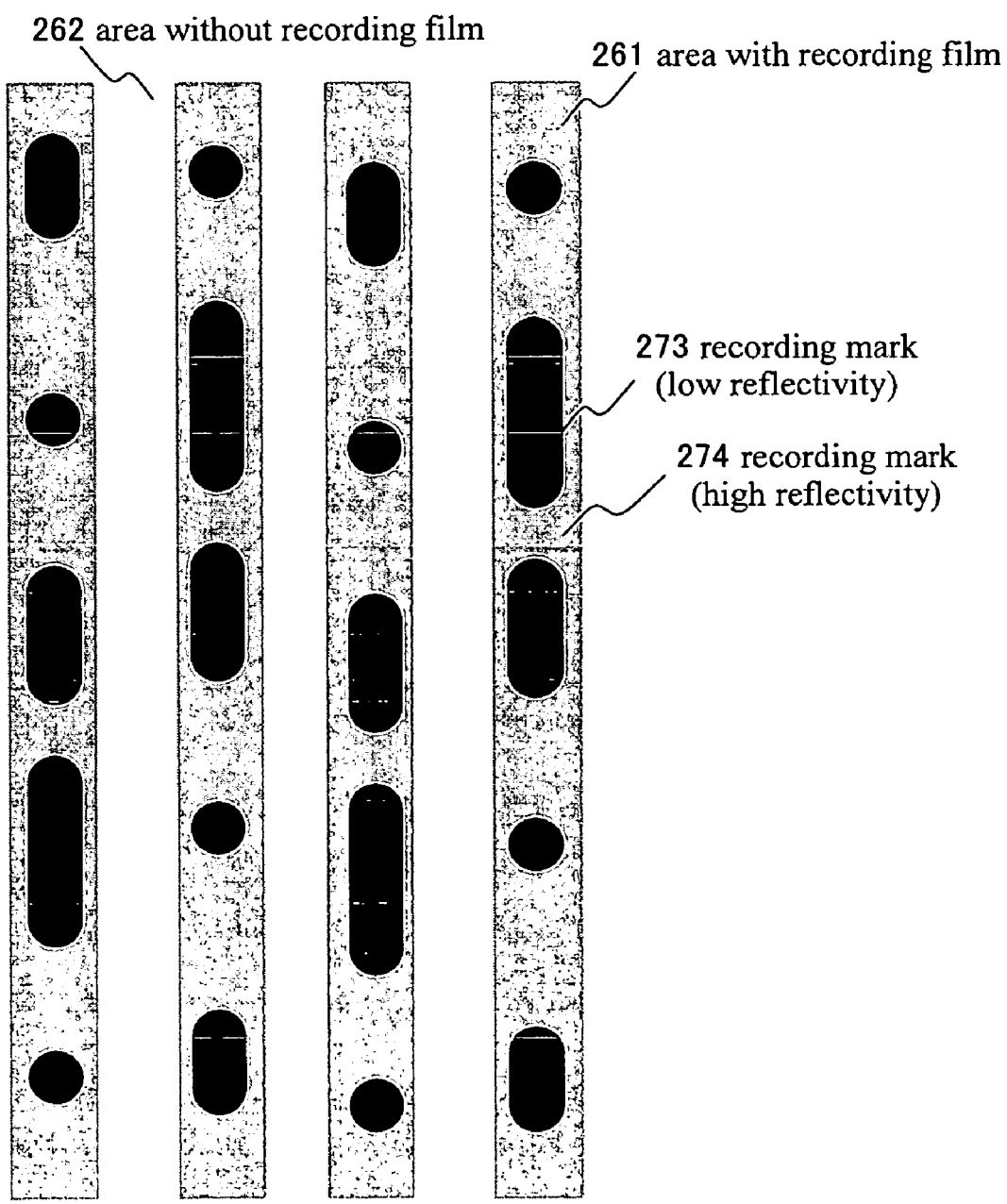
FIG. 27 is a flat view showing the recording mark placement in the tenth embodiment of this invention.
Figure 29:
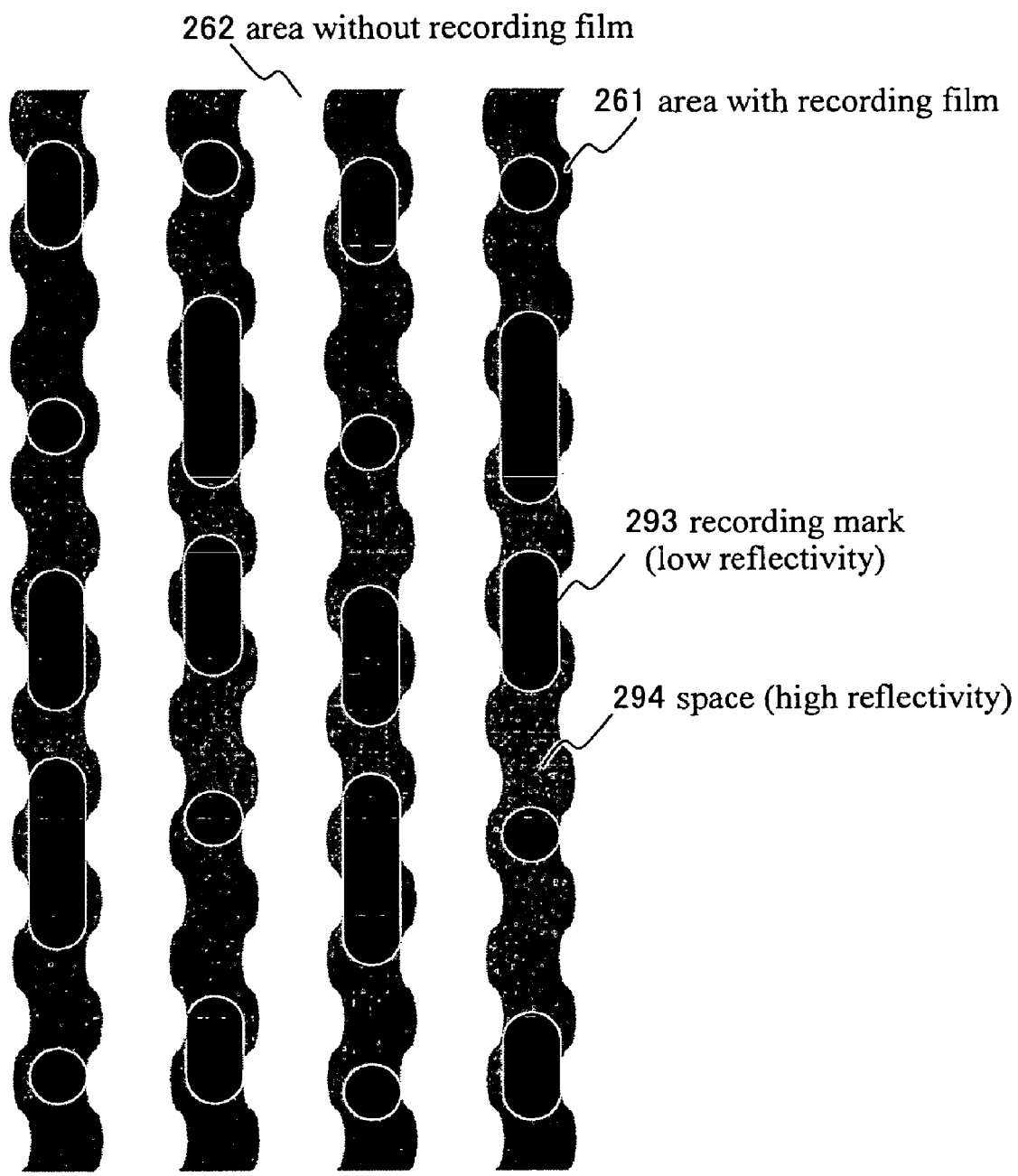
FIG. 29 is a flat view showing the recording mark placement when the groove shape is different for the tenth embodiment of this invention.

FIG. 27 and FIG. 29 are flat views showing the forming of recording marks in the area with recording film. Here, a laser beam was irradiated onto the area with recording film, and the melted film then becomes amorphous to form the recording marks 273, 293. The reflectivity of the recording marks is lower than the spaces 274, 294 so that a difference in signal amplitude was obtained. Besides being effective in multilayer medium containing tiny recording marks below the diffraction limit and the record/read of those marks, the medium and recording medium of this method are also effective for multilayer medium containing large recording marks that are larger than the diffraction limit and the record/read of those marks.

The shape of the grooves may be linear type grooves as shown in FIG. 26 or FIG. 27, or may be the wobble type grooves as shown in FIG. 28 and FIG. 29.

Recording marks can therefore be formed on the information recording medium in large quantities at one time. Moreover, a large signal intensity was obtained in the multilayer medium by utilizing this method.

Those medium structures, material, information recording methods and information reproducing (read) methods, and equipment not described in this embodiment are identical to those in the first through ninth embodiments.

Eleventh Embodiment

The eleventh embodiment is described using an example of forming large quantities of recording marks at one time by means of the difference in surface energy.

Figure 35:
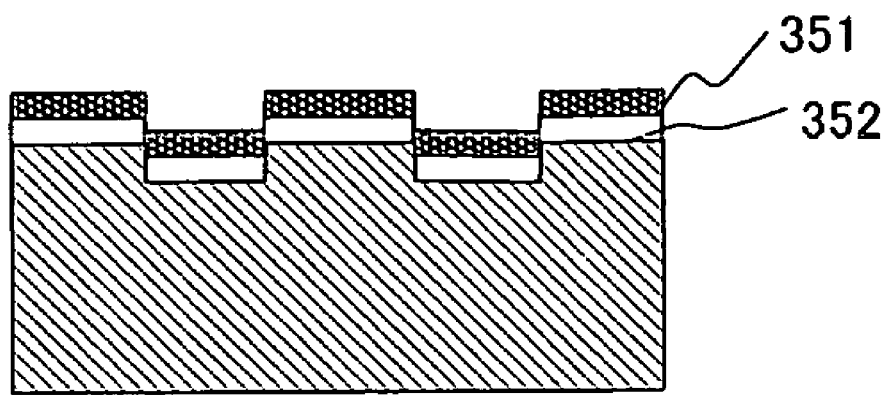
FIG. 35 is a drawing showing an example of laminations of the functional material.
Figure 35:
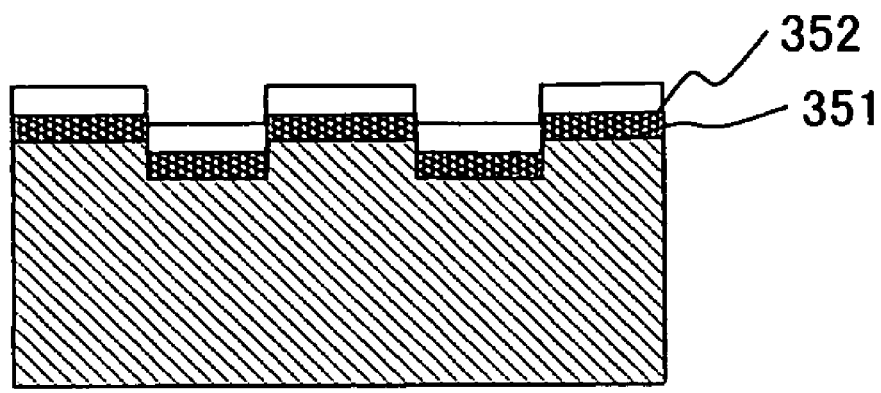

Forming Au—Ge—Sb—Te film to 25 nanometers (process 1) was described in the first embodiment. However, as shown in FIG. 35, an 8 nanometer Au film may be formed as the functional material C (352), and a 17 nanometer Ge—Sb—Te film may be formed as the functional material B (351) in that sequence. Also, as shown in (b), the 17 nanometer Ge—Sb—Te film and the 8 nanometer Au film may be separately formed in that sequence. The films for functional material B and the functional material C may be in the way be formed while mixed as in the first embodiment. The films may also be fabricated while separated into layers as in this embodiment. The functional material B and the functional material C can in this way be neatly formed even if separated by layers. Rather than two layers, the number of layers may be further increased to three layers or four layers. Using mixed layers when forming the film is preferable since they can be finely separated.

Figure 36:
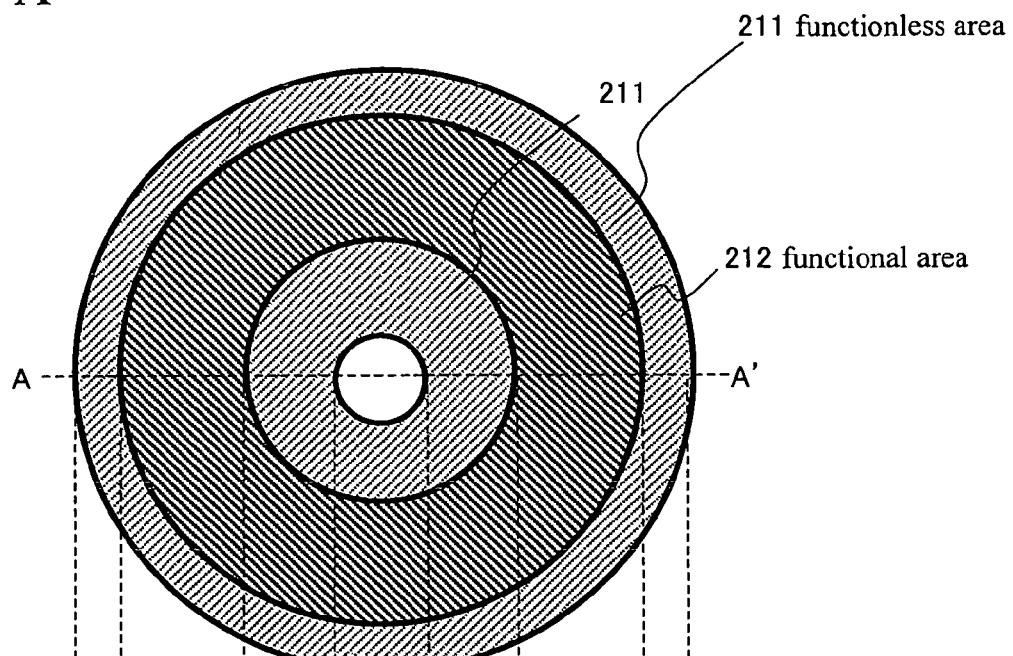
FIG. 36 is a concept drawing showing a medium where the functionless area is separated into two layers.
Figure 36:
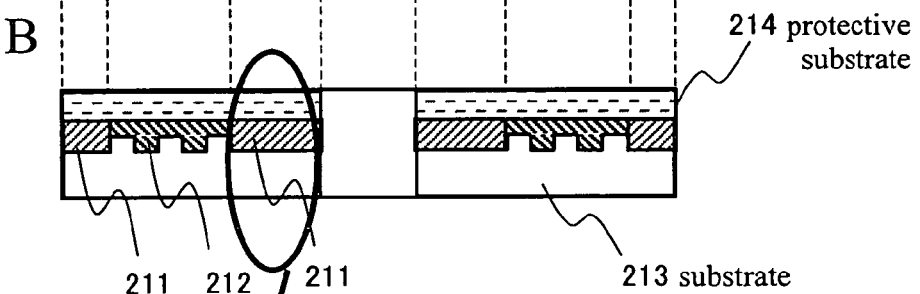
Figure 36:
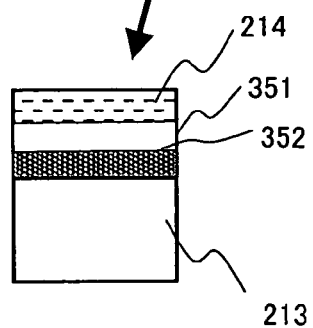

The information recording medium made in this way, differs from the first embodiment in FIG. 21 in the point that the functionless area section is separated into two layers as shown in (c) of FIG. 36.

Twelfth Embodiment

The twelfth embodiment is described utilizing a comparative example for the recording mark forming method.

COMPARATIVE EXAMPLE

Figure 32:
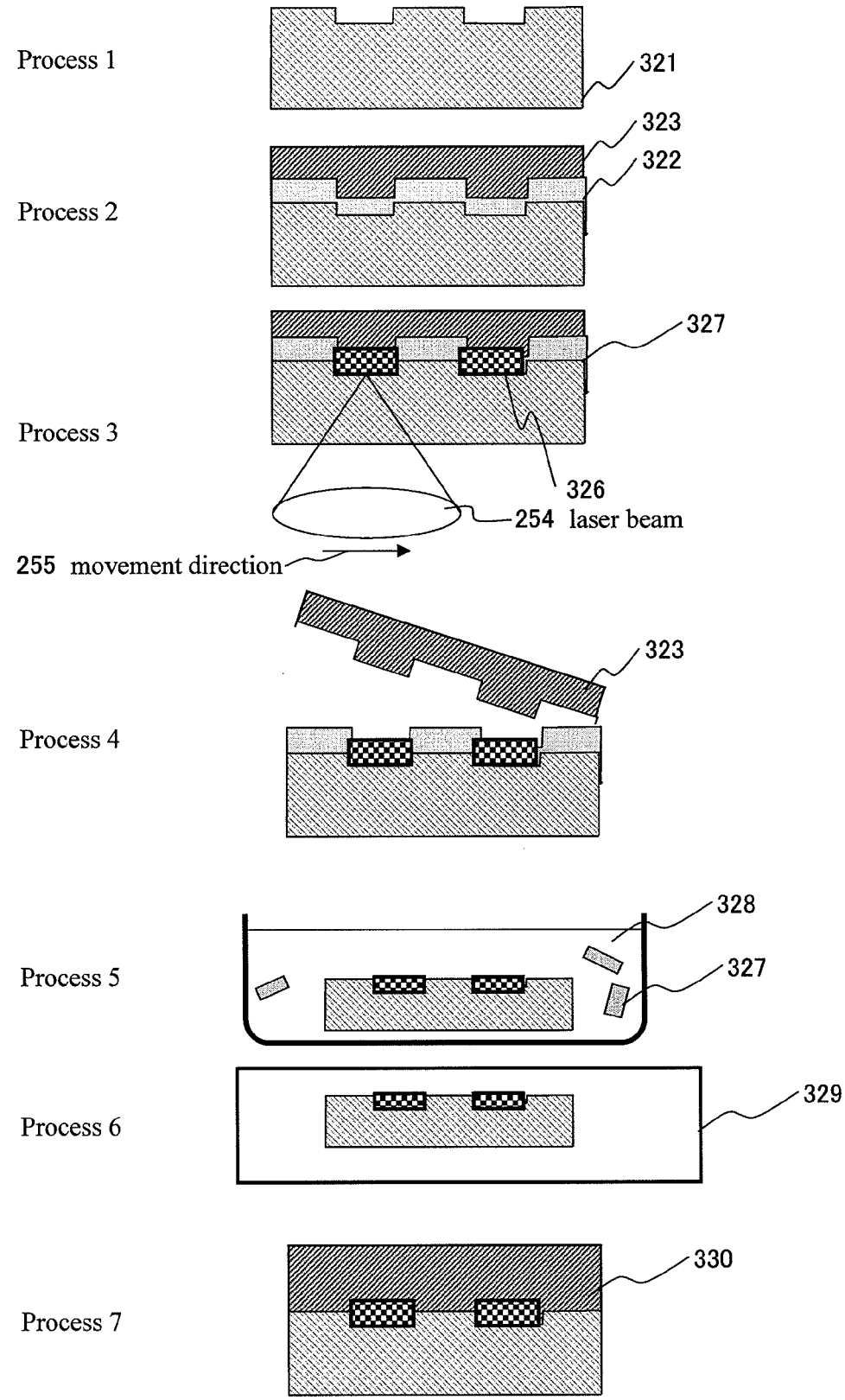
FIG. 32 is a drawing of the recording mark production method of the comparative example.

FIG. 32 shows the recording mark forming method for the disk information recording medium of the comparative example. The recording marks were fabricated as described next. First of all, a recording mark forming film 322 made from Ge—Sb—Te was deposited to 25 nm by sputtering, on a polycarbonate protective substrate 321 (process 1) that is 1.1 millimeters thick and 12 centimeters in diameter, contains tracking grooves on is covered on the surface with an $SiO_2$ film. Next, the polycarbonate film 323 was formed by aligning and attaching the polycarbonate substrates with ultraviolet curing resin. A laser beam 324 was then irradiated onto the recording mark forming film 322 as the process 3. The laser beam was moved during the irradiation in the direction shown by the moving direction 325. A spot beam of approximately 0.4 microns in diameter was utilized for the laser and irradiation performed while controlling the power according to the ROM pattern. This process separated the energy-irradiated film 322 into a amorphous state 326 and a crystallized state 327. In process 4, the protective substrate 323 is stripped away, and in process 5 the crystallized film is removed by etching through immersion in alkali etching fluid 328. After forming the recording marks in this way, the medium was dried in the electrical furnace 329 in process 6, and a protective film 330 was formed in process 7.

In these processes, the process 2 required 1 to 10 seconds, the process 3 required 1 to 5 hours, the process 4 required 100seconds, the process 5 required 10 minutes to 2 hours, the process 6 required 30 minutes, and the process 7 required 1 to 10 seconds.

(Reading the Multilayer Information Record Medium of the Comparative Example)

Figure 31:
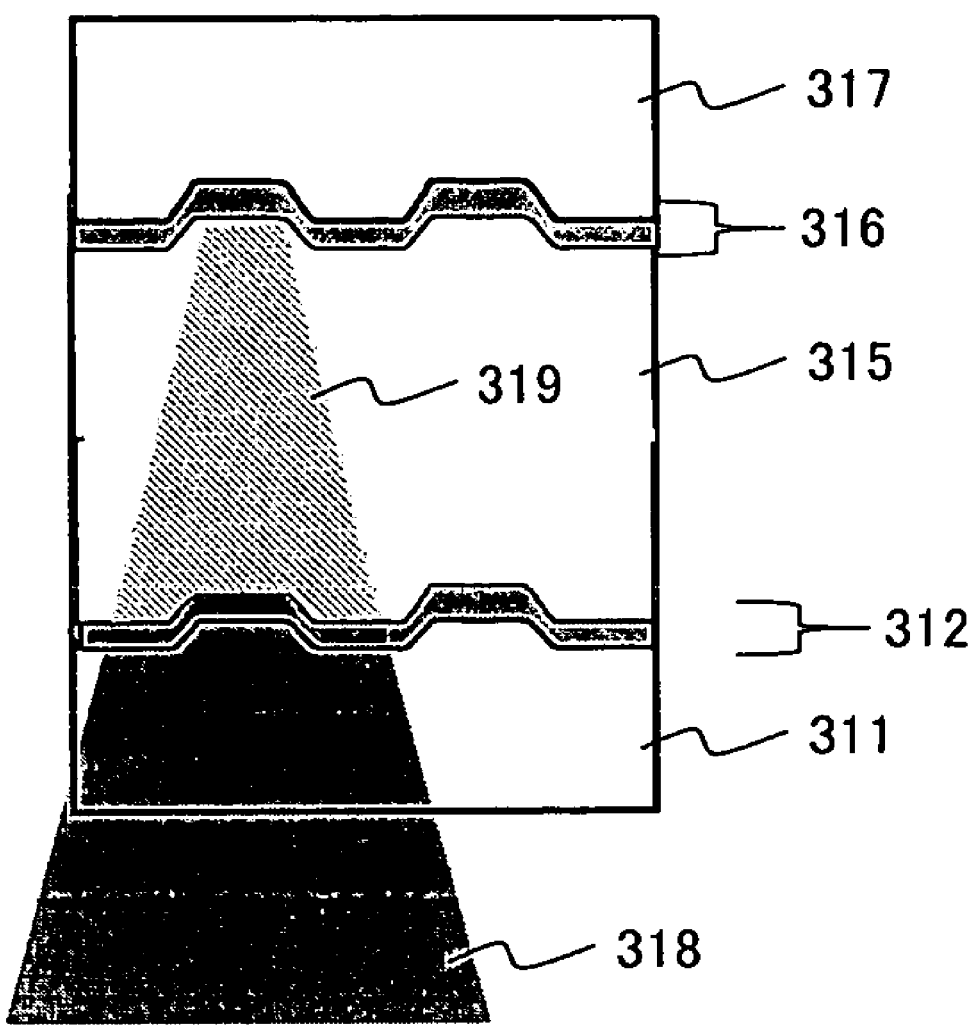
FIG. 31 is a cross sectional view of the multilayer medium of the comparative example.

The multilayer information record medium of the comparative example is shown in FIG. 31. Rather than simply two layers, this method is also applicable to the multilayer medium with many layers, however to simplify the description the example here utilizes two layers. The multilayer medium is comprised of a substrate 311, a light input side information surface 312, a spacer layer 315, an inner side information layer 316, and a protective substrate 317. The light input side information surface 312 is made up of recording marks and spaces however, either one can contain the recording film or the reflective film so the absorption rate in the marks and spaces is largely the same. The transmittance is therefore not large on the light input side, and the laser light 318 is irradiated onto the inner side information layer 316, in a weakened intensity state 319 after having transmitted through the light input side information surface 312.

In other words, the transmittance in the medium of the related art is not large so the laser irradiation intensity onto the inner layers is weak, and the reflectivity from the inner layers is also small so that the signal intensity is low.

What is claimed is:

1. An information recording medium comprising:
a substrate including a first material on a surface thereof,
a second material formed as recording marks on a first area of surface of the first material, and
a third material formed as spaces on a second area of the surface of the first material and at least having a surface curvature or a surface energy which is different from a surface curvature or a surface energy of the second material, wherein
the second material and the third material possess at least different chemical or physical characteristics, and
at least the surface energy or the surface curvature of the third material is greater than the surface energy or the surface curvature of the second material, the third material is a metal material and
a relation between an average thickness of a sum of the second material and the third material Dt and a minimum size of the recording marks Sm satisfies formula (1) and formula (2) or formula (3) and formula (4):

$Dt*10/Z \leqq Sm$  Formula (1)

$Z<4$  Formula (2)

$Dt*10/4 \leqq Sm$  Formula (3)

$Z>4$  Formula (4)

where Z is a ratio of the third material surface energy to the second material surface energy, and
an area formed of the third material contains less than 20 percent of the second material allowing the second material or the third material to melt so that recording or read can be performed.

2. An information recording medium according to claim 1, wherein in the area formed of the third material, the second material content is different between a side contacting the first material and a side possessing the surface curvature; and the side contacting the first material contains more of the second material.

3. An information recording medium according to claim 1, wherein the substrate includes dents and projections, and the second material is formed in the projections, and the third material is formed in the dents.

4. An information recording medium according to claim 1, wherein the area of the second material is a laminated structure consisting of a first film and a second film.

5. An information recording medium according to claim 1, wherein the second material is utilized as a first information recording layer,
a spacer layer is formed on the first information recording layer,
a second information recording layer is formed on the spacer layer, and
a light beam is irradiated via the first information recording layer when reading the second information recording layer.

6. An information recording medium according to claim 1, wherein
one of the second material and the third material has a lower melting temperature and the other of the second material and the third material has a higher melting temperature, and
optical characteristics during melting of the one of the second material and the third material having the lower melting temperature differ from optical characteristics of the other of the second material and the third material having the higher melting temperature.

7. An information recording medium according to claim 1, wherein the first material is a material which enables separation of the second material and the third material.

* * * * *

UNITED STATES PATENT AND TRADEMARK OFFICE
CERTIFICATE OF CORRECTION

| | |
|---|---|
| PATENT NO. | : 7,601,412 B2 |
| APPLICATION NO. | : 11/319073 |
| DATED | : October 13, 2009 |
| INVENTOR(S) | : Hirotsune et al. |

It is certified that error appears in the above-identified patent and that said Letters Patent is hereby corrected as shown below:

Title Page should read item (30) Foreign Application Priority Data

Jul. 6, 2005  (JP)   2005-196967

Signed and Sealed this

Eighth Day of December, 2009

David J. Kappos
*Director of the United States Patent and Trademark Office*